(12) United States Patent
Li et al.

(10) Patent No.: US 12,508,312 B2
(45) Date of Patent: *Dec. 30, 2025

(54) CHIMERIC ANTIGEN RECEPTOR TARGETING CLL1 AND USE THEREOF

(71) Applicant: GUANGZHOU BIO-GENE TECHNOLOGY CO., LTD, Guangdong (CN)

(72) Inventors: Guangchao Li, Guangdong (CN); Min Luo, Guangdong (CN); Wen Ding, Guangdong (CN); Zhao Zhou, Guangdong (CN); Xuejun Wang, Guangdong (CN)

(73) Assignee: GUANGZHOU BIO-GENE TECHNOLOGY CO., LTD, Guangdong (CN)

( * ) Notice: Subject to any disclaimer, the term of this patent is extended or adjusted under 35 U.S.C. 154(b) by 1051 days.

This patent is subject to a terminal disclaimer.

(21) Appl. No.: 17/612,212

(22) PCT Filed: Dec. 22, 2020

(86) PCT No.: PCT/CN2020/138257
§ 371 (c)(1),
(2) Date: Nov. 17, 2021

(87) PCT Pub. No.: WO2022/120942
PCT Pub. Date: Jun. 16, 2022

(65) Prior Publication Data
US 2022/0354890 A1 Nov. 10, 2022

(30) Foreign Application Priority Data
Dec. 11, 2020 (CN) .......................... 202011461194.7

(51) Int. Cl.
*A61K 40/13* (2025.01)
*A61K 38/00* (2006.01)
(Continued)

(52) U.S. Cl.
CPC .............. *A61K 40/13* (2025.01); *A61K 40/11* (2025.01); *A61K 40/31* (2025.01);
(Continued)

(58) Field of Classification Search
CPC ........ A61K 40/13; A61K 40/11; A61K 40/31; A61K 40/4202; A61K 38/00;
(Continued)

(56) References Cited

U.S. PATENT DOCUMENTS 8,536,310 B2 9/2013 Abo et al.
12,358,990 B2 7/2025 Luo et al.
(Continued)

FOREIGN PATENT DOCUMENTS

| CA | 2973525 A1 | 8/2016 |
|---|---|---|
| CN | 104736562 A | 6/2015 |

(Continued)

OTHER PUBLICATIONS

Office Action corresponding to KR Patent Application No. 10-2022-7011658 dated Sep. 19, 2024 (translation).
(Continued)

*Primary Examiner* — Jeffrey Stucker
(74) *Attorney, Agent, or Firm* — Jenkins, Taylor & Hunt, P.A.

(57) ABSTRACT

Provided is a chimeric antigen receptor targeting CLL1 and an application thereof. The chimeric antigen receptor targeting CLL1 comprises an antigen binding domain, a hinge region, a transmembrane domain and a signal transduction domain; the antigen binding domain is an anti-CLL1 antibody. The present application uses an anti-CLL1 antibody as (Continued)

the antigen binding domain to construct a chimeric antigen receptor molecule, the chimeric antigen receptor targeting CLL1 has specific targeting effect on CLL1 positive tumor cells, and immune cells expressing chimeric antigen receptor targeting CLL1 have a significant killing effect in vitro and in vivo, and secrete a large amount of cytokine IFN-γ after co-cultured with CLL1 positive tumor cells, which has a specific clearance effect on CLL1 positive tumor cells.

20 Claims, 4 Drawing Sheets

Specification includes a Sequence Listing.

(51) Int. Cl.
| | |
|---|---|
| A61K 40/11 | (2025.01) |
| A61K 40/31 | (2025.01) |
| A61K 40/42 | (2025.01) |
| A61P 35/00 | (2006.01) |
| C07K 14/705 | (2006.01) |
| C07K 14/715 | (2006.01) |
| C07K 14/725 | (2006.01) |
| C07K 16/28 | (2006.01) |
| C12N 5/0783 | (2010.01) |
| C12N 7/00 | (2006.01) |
| C12N 15/62 | (2006.01) |
| C12N 15/86 | (2006.01) |

(52) U.S. Cl.
CPC .......... *A61K 40/4202* (2025.01); *A61P 35/00* (2018.01); *C07K 14/705* (2013.01); *C07K 14/7051* (2013.01); *C07K 14/70517* (2013.01); *C07K 14/7151* (2013.01); *C07K 16/2851* (2013.01); *C12N 5/0636* (2013.01); *C12N 7/00* (2013.01); *C12N 15/625* (2013.01); *C12N 15/86* (2013.01); *A61K 38/00* (2013.01); *A61K 2239/48* (2023.05); *C12N 2740/15042* (2013.01); *C12N 2740/15052* (2013.01)

(58) Field of Classification Search
CPC ................ A61K 2239/48; A61K 40/42; A61K 2121/00; A61K 2300/00; A61K 40/4224; A61P 35/00; A61P 35/02; C07K 14/705; C07K 14/7051; C07K 14/70517; C07K 14/7151; C07K 16/2851; C07K 2317/622; C07K 2319/00; C07K 2319/02; C07K 2319/03; C07K 2319/33; C07K 14/70578; C07K 14/70521; C12N 5/0636; C12N 7/00; C12N 15/625; C12N 15/86; C12N 2740/15042; C12N 2740/15052; C12N 2510/00; C12N 2740/16043; C12N 2740/15021; C12N 2740/15043; C12N 2800/107

See application file for complete search history.

(56) References Cited

U.S. PATENT DOCUMENTS

| | | |
|---|---|---|
| 2013/0295118 A1 | 11/2013 | Jiang et al. |
| 2015/0376290 A1 | 12/2015 | Jiang et al. |
| 2016/0075787 A1 | 3/2016 | Zheng et al. |
| 2016/0368994 A1 | 12/2016 | Kelley et al. |
| 2017/0283500 A1 | 10/2017 | Wiltzius et al. |
| 2022/0396626 A1 | 12/2022 | Luo et al. |

FOREIGN PATENT DOCUMENTS

| | | | | |
|---|---|---|---|---|
| CN | 106163547 | A | 11/2016 | |
| CN | 107001465 | A | 8/2017 | |
| CN | 107406516 | | 11/2017 | |
| CN | 107406516 | A * | 11/2017 | ............ A61K 35/17 |
| CN | 107847568 | A | 3/2018 | |
| CN | 108633287 | A | 10/2018 | |
| CN | 109803681 | A | 5/2019 | |
| CN | 110357960 | A | 10/2019 | |
| CN | 110831619 | A | 2/2020 | |
| CN | 111116753 | A | 5/2020 | |
| CN | 111432823 | A | 7/2020 | |
| CN | 111662384 | A | 9/2020 | |
| CN | 113045658 | B | 12/2021 | |
| CN | 113980134 | B | 5/2022 | |
| CN | 113896795 | B | 7/2022 | |
| EP | 4039708 | A1 | 8/2022 | |
| GB | 2610467 | A | 3/2023 | |
| JP | 2015519336 | A | 7/2015 | |
| JP | 2017534256 | A | 11/2017 | |
| JP | 2018504459 | A | 2/2018 | |
| JP | 2018522541 | A | 8/2018 | |
| JP | 7384493 | B2 | 11/2023 | |
| KR | 20170135822 | A | 12/2017 | |
| KR | 20220084013 | A | 6/2022 | |
| WO | WO 2016/120218 | A1 | 8/2016 | |
| WO | WO 2017/091615 | A1 | 6/2017 | |
| WO | 2017/173256 | | 10/2017 | |
| WO | WO 2017/173384 | A1 | 10/2017 | |
| WO | WO 2019/139888 | A1 | 7/2019 | |
| WO | WO 2019/246593 | A2 | 12/2019 | |
| WO | 2020/035676 | | 2/2020 | |
| WO | WO-2020083406 | A1 * | 4/2020 | ............ A61K 35/17 |
| WO | WO 2022/120943 | A1 | 6/2022 | |

OTHER PUBLICATIONS

Office Action (and corresponding translation) mailed on Mar. 29, 2022 for CN Application No. 202011461194.7.
Office Action corresponding to Japanese Patent Application No. 2022-529577 dated May 16, 2023 (translation).
Laborda et al. (2017) "Development of a Chimeric Antigen Receptor Targeting C-Type Lectin-Like Molecule-1 for Human Acute Myeloid Leukemia," Int. J. Mol. Sci., vol. 18, No. 11, pp. 1-8.
Ma H., et al., "Targeting CLL-1 for acute Myeloid Leukemia Therapy", Journal of Hematology & Oncology, vol. 12, No. 1, 2019, pp. 1-11.
Partial European Search Report for European Application No. 20958917.5, mailed on Mar. 15, 2024, 18 Pages.
Tashiro H., et al., "Treatment of Acute Myeloid Leukemia with T Cells Expressing Chimeric Antigen Receptors Directed to C-type Lectin-like Molecule 1", Molecular Therapy, vol. 25, No. 9, 2017, pp. 2202-2213.
International Search Report mailed on Sep. 10, 2021 for PCT Application No. PCT/CN2020/138257.
Almagro, J.C., et al., "Progress and Challenges in the Design and Clinical Development of Antibodies for Cancer Therapy", Frontiers in Immunology, vol. 8, Jan. 4, 2018, 19 pages.
Decision to Grant received in Japanese Patent Application No. 2022-529575 mailed on Oct. 3, 2023, 5 pages.
Estep, P., et al., "High throughput solution-based measurement of antibody-antigen affinity and epitope binning", MAbs, vol. 5, No. 2, 2013, pp. 270-278.
Extended European Search received in European Patent Application No. 20958916.7, mailed on Oct. 6, 2023, 9 pages.
International Preliminary Report on Patentability received in PCT Application No. PCT/CN2020/138286, mailed in Jun. 22, 2023, 11 pages.
International Search Report mailed on Sep. 10, 2021 for PCT Application No. PCT/CN2020/138286, 20 Pages.
Lu, H., et al., "Targeting Human C-Type Lectin-like Molecule-1 (CLL1) with a Bispecific Antibody for Immunotherapy of Acute Myeloid Leukemia", Angewandte Chemie Int Ed Engl., vol. 53, No. 37, Sep. 8, 2014, pp. 9841-9845.
Notice of Allowance for U.S. Appl. No. 17/609,340 dated Apr. 4, 2025.
Notification of grant in Chinese Patent Application No. 202011458917.8, mailed on Nov. 19, 2021, 4 pages.

(56) References Cited

OTHER PUBLICATIONS

Notification of grant received in Chinese Patent Application No. 202111276097.5, mailed on Apr. 28, 2022, 4 pages.
Notification of grant in Chinese Patent Application No. 202111276003.4, mailed on Jun. 6, 2022, 4 pages.
Office Action corresponding to Chinese Patent Application No. 202011458917.8, mailed on Sep. 16, 2021, 11 pages.
Office Action corresponding to Chinese Patent Application No. 202111276003.4, mailed on Mar. 17, 2022, 11 pages.
Office Action corresponding to Chinese Patent Application No. 202111276097.5, mailed on Mar. 25, 2022 (translation).
Office Action corresponding to Japanese Patent Application No. 2022-529575 dated May 19, 2023 (translation).
Office Action (Restriction Requirement) corresponding to U.S. Appl. No. 17/609,340 dated Nov. 12, 2024.
Rong-Guang, S., "Monoclonal Antibody-based Cancer Immunotherapy," Acta Pharmaceutical Sciences, vol. 55, No. 06, 2020, pp. 1110-1118.
Zhao, X., et al., "Targeting C-type lectin-like molecule-1 for antibody-mediated immunotherapy in acute myeloid leukemia", Raematologica, vol. 95, No. 1, Jul. 31, 2009, pp. 71-78.
Zheng, B., et al., "An Anti-CLL-1 Antibody-Drug Conjugate for the Treatment of Acute Myeloid Leukemia", Clinical Cancer Research., vol. 25, No. 4, Feb. 15, 2019, pp. 1358-1368.

\* cited by examiner

CHIMERIC ANTIGEN RECEPTOR TARGETING CLL1 AND USE THEREOF

CROSS-REFERENCE TO RELATED APPLICATIONS

This application is a US National Stage entry under 35 USC § 371 of PCT Application No. PCT/CN2020/138257, filed Dec. 22, 2020, which claims benefit and priority to CN application No. 202011461194.7, filed Dec. 11, 2020, the full disclosures of which are hereby incorporated by reference in their entireties.

TECHNICAL FIELD

The present application belongs to the field of biomedicine, and relates to a chimeric antigen receptor targeting CLL1 and use thereof.

BACKGROUND

C-type lectin-like molecule 1 (CLL1), also known as C-type lectin domain family 12 member A (CLEC12A), is a type II transmembrane protein. Studies have shown that CLL1 is restrictedly expressed on hematopoietic cells, mainly including myeloid-derived cells in peripheral blood and bone marrow, such as monocytes, dendritic cells, granulocytes, and most acute myeloid leukemia (AML) cells. It is worth noting that although CLL1 is abundantly expressed on myeloid cells in peripheral blood and bone marrow, it is not expressed on myeloid-derived cells in peripheral tissues, for example, neither tissue macrophages nor tissue dendritic cells express CLL1. The study also found that CLL1 is expressed on AML stem cells (CD34+/CD38−) and a small part of hematopoietic progenitor cells (CD34+/CD38+ or CD34+/CD33+), but not on normal hematopoietic stem cells (CD34+/CD38− or CD34+/CD33−).

Due to this special expression pattern, CLL1 is expected to become a potential target for the diagnosis and treatment of AML. However, there are few reports of immunotherapy targeting CLL1.

SUMMARY

The present application provides a chimeric antigen receptor targeting CLL1 and use thereof. The chimeric antigen receptor targeting CLL1 uses anti-CLL1 antibody with binding ability to CLL1 as antigen binding domain, which can bind not only purified or free CLL1 protein but also CLL1 protein on the cell surface; and immune cells expressing the chimeric antigen receptor targeting CLL1 have important application in the field of tumor therapy.

In a first aspect, the present application provides a chimeric antigen receptor targeting CLL1 comprising an antigen binding domain, a hinge region, a transmembrane domain, and a signal transduction domain;

wherein the antigen binding domain is an anti-CLL1 antibody.

In the present application, an anti-CLL1 antibody with binding ability to CLL1 is used as the antigen binding domain of the chimeric antigen receptor, so that the chimeric antigen receptor can specifically bind to CLL1 positive tumor cells, and achieve a specific targeting effect on CLL1 positive tumors.

In some specific embodiments, the antigen binding domain includes the amino acid sequence shown in SEQ ID NO: 1 and SEQ ID NO: 2, wherein SEQ ID NO: 1 and SEQ ID NO: 2 are connected by a linker peptide to form an anti-CLL1 antibody 19C1; wherein

```
SEQ ID NO: 1:
QVQLQQSGAELMKPGASVKISCKATGYTFSSYWIEWVKQRPGHGLEW

IGEIFPGSGSIKYNEKFKGKATFTADTSSNTAYMQLSSLTSEDSAVH

YCARGGTYNDYSLFDYWGQGTTLTVSS;

SEQ ID NO: 2:
QIVLTQSPAIMSASPGEKVTMTCSASSSVSYMYWYQQKPGSSPRLLI

FDTSNLASGVPVRFSGSGSGTSYSLTISRMEAEDAATYYCQQWSSYP

LTFGAGTKLELK.
```

In some specific embodiments, the antigen binding domain includes the amino acid sequence shown in SEQ ID NO: 3 and SEQ ID NO: 4, wherein SEQ ID NO: 3 and SEQ ID NO: 4 are connected by a linker peptide to form an anti-CLL1 antibody 23D7; wherein

```
SEQ ID NO: 3:
QVQLQQPGSDLVRPGASVKLSCKASGYTFTRYWMHWVKQRPGHGLEWIGY

IYPGSGTSNYDEKFKSKATLTVDTSSSTAYMQLSSLTSEDSAVYYCTREA

RYTMDYWGQGTSVTVSS;

SEQ ID NO: 4:
QIVLTQSPAIMSASPGEKVTMTCSASSSVSYIYWYQQKPGSSPGLLIYDT

SNLASGVPVRFSGSGSGTSYSLTISRMEAEDAATYYCQQWSSFPPTFGAG

TKLELK.
```

In some specific embodiments, the antigen binding domain includes the amino acid sequence shown in SEQ ID NO: 5 and SEQ ID NO: 6, wherein SEQ ID NO: 5 and SEQ ID NO: 6 are connected by a linker peptide to form an anti-CLL1 antibody 27H4; wherein

```
SEQ ID NO: 5:
EVQLQQSGPELVKPGASVKISCKASGYSFTGYHMHWVKQSHVKSLEWIGR

INPYNGAASHNQKFKDKATLTVDKSSSTAYMELHSLTSEDSAVYYCARGW

DYDGGYYAMDYWGQGTSVTVSS;

SEQ ID NO: 6:
DIVMSQSPSSLAVSVGEKVTMSCKSSQSLLYSDNQKNYLAWYQQKPGQSP

KLLIYWASTRESGVPDRFTGSGSGTDFTLTISSVKAEDLAVYYCQQYYTY

PYTFGGGTKLEIK.
```

In some specific embodiments, the antigen binding domain includes the amino acid sequence shown in SEQ ID NO: 7 and the amino acid sequence shown in one of SEQ ID NO: 8 to 10, wherein SEQ ID NO: 7 and SEQ ID NO: 8 are connected by a linker peptide to form an anti-CLL1 antibody H27H4L1, SEQ ID NO: 7 and SEQ ID NO: 9 are connected by a linker peptide to form an anti-CLL1 antibody H27H4L2, or SEQ ID NO: 7 and SEQ ID NO: 10 are connected by a linker peptide to form an anti-CLL1 antibody H27H4L3; wherein

```
SEQ ID NO: 7:
EVQLVQSGAEVKKPGASVKVSCKASGYTFTGYHMHWVRQAPGQRLEWMGR
```

```
INPYNGAASHNQKFKDRVTITRDTSASTAYMELSSLRSEDTAVYYCARGW

DYDGGYYAMDYWGQGTLVTVSS;

SEQ ID NO: 8:
DIQMTQSPSSLSASVGDRVTITCKSSQSLLYSDNQKNYLAWYQQKPGKAP

KLLIYWASTRESGVPSRFSGSGSGTDFTLTISSLQPEDFATYYCQQYYTY

PYTFGQGTKLEIK;

SEQ ID NO: 9:
DIVMTQSPLSLPVTPGEPASISCKSSQSLLYSDNQKNYLAWYLQKPGQSP

QLLIYWASTRESGVPDRFSGSGSGTDFTLKISRVEAEDVGVYYCQQYYTY

SEQ ID NO: 10:
DIVMTQSPDSLAVSLGERATINCKSSQSLLYSDNQKNYLAWYQQKPGQPP

KLLIYWASTRESGVPDRFSGSGSGTDFTLTISSLQAEDVAVYYCQQYYTY

PYTFGQGTKLEIK.
```

In some specific embodiments, the antigen binding domain includes the amino acid sequence shown in SEQ ID NO: 11 and SEQ ID NO: 12, wherein SEQ ID NO: 11 and SEQ ID NO: 12 are connected by a linker peptide to form an anti-CLL1 antibody 1075.7; wherein

```
SEQ ID NO: 11:
DIQLQESGPGLVKPSQSLSLTCSVTGYSITSAYYWNWIRQFPGNKLEWMG

YISYDGRNNYNPSLKNRISITRDTSKNQFFLKLNSVTTEDTATYYCAKEG

DYDVGNYYAMDYWGQGTSVTVSS;

SEQ ID NO: 12:
ENVLTQSPAIMSASPGEKVTMTCRASSNVISSYVHWYQQRSGASPKLWIY

STSNLASGVPARFSGSGSGTSYSLTISSVEAEDAATYYCQQYSGYPLTFG

AGTKLEL.
```

Preferably, the hinge region includes a CD8α hinge region.
Preferably, the transmembrane domain includes a CD8α transmembrane region and/or a CD28 transmembrane region, preferably a CD8α transmembrane region.
Preferably, the signal transduction domain includes CD3ζ.
Preferably, the signal transduction domain further includes any one or a combination of at least two of 4-1BB, CD28 intracellular region, DAP10 or OX40.
Preferably, the chimeric antigen receptor targeting CLL1 further includes a signal peptide.
Preferably, the signal peptide includes a CD8α signal peptide and/or an IgGκ light chain signal peptide.
As a preferred technical solution, the chimeric antigen receptor targeting CLL1 includes a signal peptide, an anti-CLL1 antibody, a CD8α hinge region, a CD8α transmembrane region, 4-1BB and CD3ζ.
In some specific embodiments, the chimeric antigen receptor targeting CLL1 is 19C1-CAR, which includes the amino acid sequence shown in SEQ ID NO: 13; wherein

```
SEQ ID NO: 13:
MALPVTALLLPLALLLHAARPQIVLTQSPAIMSASPGEKVTMTCSASSSV

SYMYWYQQKPGSSPRLLIFDTSNLASGVPVRFSGSGSGTSYSLTISRMEA

EDAATYYCQQWSSYPLTFGAGTKLELKGGGGSGGGGSGGGGSQVQLQQSG

AELMKPGASVKISCKATGYTFSSYWIEWVKQRPGHGLEWIGEIFPGSGSI

KYNEKFKGKATFTADTSSNTAYMQLSSLTSEDSAVHYCARGGTYNDYSLF

DYWGQGTTLTVSSTTTPAPRPPTPAPTIASQPLSLRPEACRPAAGGAVHT

RGLDFACDIYIWAPLAGTCGVLLLSLVITLYCKRGRKKLLYIFKQPFMRP

VQTTQEEDGCSCRFPEEEEGGCELRVKFSRSADAPAYQQGQNQLYNELNL

GRREEYDVLDKRRGRDPEMGGKPRRKNPQEGLYNELQKDKMAEAYSEIGM

KGERRRGKGHDGLYQGLSTATKDTYDALHMQALPPR*.
```

In some specific embodiments, the chimeric antigen receptor targeting CLL1 is 23D7-CAR, which includes the amino acid sequence shown in SEQ ID NO: 14; wherein

```
SEQ ID NO: 14:
MALPVTALLLPLALLLHAARPQIVLTQSPAIMSASPGEKVTMTCSASSSV

SYIYWYQQKPGSSPGLLIYDTSNLASGVPVRFSGSGSGTSYSLTISRMEA

EDAATYYCQQWSSFPPTFGAGTKLELKGGGGSGGGGSGGGGSQVQLQQPG

SDLVRPGASVKLSCKASGYTFTRYWMHWVKQRPGHGLEWIGYIYPGSGTS

NYDEKFKSKATLTVDTSSSTAYMQLSSLTSEDSAVYYCTREARYTMDYWG

QGTSVTVSSTTTPAPRPPTPAPTIASQPLSLRPEACRPAAGGAVHTRGLD

FACDIYIWAPLAGTCGVLLLSLVITLYCKRGRKKLLYIFKQPFMRPVQTT

QEEDGCSCRFPEEEEGGCELRVKFSRSADAPAYQQGQNQLYNELNLGRRE

EYDVLDKRRGRDPEMGGKPRRKNPQEGLYNELQKDKMAEAYSEIGMKGER

RRGKGHDGLYQGLSTATKDTYDALHMQALPPR*.
```

In some specific embodiments, the chimeric antigen receptor targeting CLL1 is 27H4-CAR, which includes the amino acid sequence shown in SEQ ID NO: 15; wherein

```
SEQ ID NO: 15:
MALPVTALLLPLALLLHAARPDIVMSQSPSSLAVSVGEKVTMSCKSSQSL

LYSDNQKNYLAWYQQKPGQSPKLLIYWASTRESGVPDRFTGSGSGTDFTL

TISSVKAEDLAVYYCQQYYTYPYTFGGGTKLEIKGGGGSGGGGSGGGGSE

VQLQQSGPELVKPGASVKISCKASGYSFTGYHMHWVKQSHVKSLEWIGRI

NPYNGAASHNQKFKDKATLTVDKSSSTAYMELHSLTSEDSAVYYCARGWD

YDGGYYAMDYWGQGTSVTVSSTTTPAPRPPTPAPTIASQPLSLRPEACRP

AAGGAVHTRGLDFACDIYIWAPLAGTCGVLLLSLVITLYCKRGRKKLLYI

FKQPFMRPVQTTQEEDGCSCRFPEEEEGGCELRVKFSRSADAPAYQQGQN

QLYNELNLGRREEYDVLDKRRGRDPEMGGKPRRKNPQEGLYNELQKDKMA

EAYSEIGMKGERRRGKGHDGLYQGLSTATKDTYDALHMQALPPR*.
```

In some specific embodiments, the chimeric antigen receptor targeting CLL1 is H27H4-CAR, which includes the amino acid sequence shown in SEQ ID NO: 16: wherein

```
SEQ ID NO: 16:
MDMRVPAQLLGLLLLWLRGARCDIQMTQSPSSLSASVGDRVTITCKSSQS

LLYSDNQKNYLAWYQQKPGKAPKLLIYWASTRESGVPSRFSGSGSGTDFT

LTISSLQPEDFATYYCQQYYTYPYTFGQGTKLEIKGGGGSGGGGSGGGGS
```

EVQLVQSGAEVKKPGASVKVSCKASGYTFTGYHMHWVRQAPGQRLEWMGR

INPYNGAASHNQKFKDRVTITRDTSASTAYMELSSLRSEDTAVYYCARGW

DYDGGYYAMDYWGQGTLVTVSSTTTPAPRPPTPAPTIASQPLSLRPEACR

PAAGGAVHTRGLDFACDIYIWAPLAGTCGVLLLSLVITLYCKRGRKKLLY

IFKQPFMRPVQTTQEEDGCSCRFPEEEEGGCELRVKFSRSADAPAYQQGQ

NQLYNELNLGRREEYDVLDKRRGRDPEMGGKPRRKNPQEGLYNELQKDKM

AEAYSEIGMKGERRRGKGHDGLYQGLSTATKDTYDALHMQALPPR*.

In some specific embodiments, the chimeric antigen receptor targeting CLL1 is 1075.7-CAR, which includes the amino acid sequence shown in SEQ ID NO: 17: wherein

SEQ ID NO: 17:
MALPVTALLLPLALLLHAARPENVLTQSPAIMSASPGEKVTMTCRASSNV

ISSYVHWYQQRSGASPKLWIYSTSNLASGVPARFSGSGSGTSYSLTISSV

EAEDAATYYCQQYSGYPLTFGAGTKLELGGGGSGGGGSGGGGSDIQLQES

GPGLVKPSQSLSLTCSVTGYSITSAYYWNWIRQFPGNKLEWMGYISYDGR

NNYNPSLKNRISITRDTSKNQFFLKLNSVTTEDTATYYCAKEGDYDVGNY

YAMDYWGQGTSVTVSSTTTPAPRPPTPAPTIASQPLSLRPEACRPAAGGA

VHTRGLDFACDIYIWAPLAGTCGVLLLSLVITLYCKRGRKKLLYIFKQPF

MRPVQTTQEEDGCSCRFPEEEEGGCELRVKFSRSADAPAYQQGQNQLYNE

LNLGRREEYDVLDKRRGRDPEMGGKPRRKNPQEGLYNELQKDKMAEAYSE

IGMKGERRRGKGHDGLYQGLSTATKDTYDALHMQALPPR*.

In a second aspect, the present application provides a nucleic acid molecule comprising a coding gene of the chimeric antigen receptor targeting CLL1 described in the first aspect.

In some specific embodiments, the nucleic acid molecule includes the nucleic acid sequence shown in SEQ ID NO: 18, which is the coding gene of 19C1-CAR;

SEQ ID NO: 18:
atggccctcccagtcacagctctgctgctcccactcgccctgctgctgca cgccgcacggcctcagatcgtcctcacccagtctccagccatcatgagcg cctctccaggcgagaaggtgacaatgacttgttccgcaagcagctcagtt agttacatgtattggtaccagcagaaaccaggctcttctccaaggctcct gatcttcgacacttctaacctggcatccggagtcccagtgcggttcagcg gcagcggcagtggaacatcttatagcctgactattagccggatggaggca gaagatgcagctacctactactgtcaacagtggtctagttatccactcac ttttggtgcagggaccaagctggagctcaaaggtggaggaggatctggcg gcggagggagtggaggaggcggctcacaggtccaactgcagcaatctggt gcagaactgatgaagcctggagcaagcgttaaaatctcttgcaaagcaac aggatacacctttactttcctactggatagagtgggtgaaacaaagaccag gacacggactggaatggataggagagatctttcctggcagcggctcaatc aagtataacgagaagttcaaagggaaagccaccttcacagccgatacctc ttctaatacagcctatatgcagctgtcatccctgaccagcgaagattctg ctgttcactactgtgcacgcggaggaacatacaatgactactctctgttt gactattggggacagggcaccacactgactgtgagttctactacgacccc tgcaccgcggccgcctactcctgcacctacaatcgcaagtcagccactga gtctcagacccgaagcatgccgccctgctgcaggcggagctgtccataca cgcggactggactttgcatgcgatatatacatctgggcaccactggccgg cacttgcgcgtgctgctcctgtccctcgtgattaccctgtactgcaaac gcggcaggaagaagctcctgtatatctttaaacagcccttcatgaggcca gtgcagaccactcaagaggaagacggttgtagctgccggtttcccgagga agaagagggaggctgcgagctccgcgtgaagttctcccgctcagccgatg caccgcctatcagcaagggcagaaccagctgtacaatgagctcaacctg ggaagaagggaggaatatgacgttctggataaacggcgcggtcgcgatcc cgaaatgggtgggaagcctcgcaggaagaatcctcaggaagggctctaca atgagctgcagaaagacaaaatgcagaggcctattctgaaatcggcatg aagggcgagcgccgcagaggcaaaggacacgacggcctgtaccagggcct gtctacagccaccaaggacacctatgacgctctccacatgcaagccctgc caccaaggtga.

In some specific embodiments, the nucleic acid molecule includes the nucleic acid sequence shown in SEQ ID NO: 19, which is the coding gene of 23D7-CAR;

SEQ ID NO: 19:
atggctctccctgttactgcactcctgctcccactggcactgctgctgca tgccgctcggccacaaatagttctgactcagagtcctgccattatgtcag cctctcctggagagaaggtcacaatgacttgctctgcctctagtagtgtg tcttacatatactggtaccagcagaagcctggttcttctcccggactgct gatctatgacacatccaatctggcttcaggcgttcccgtcagattcagcg ggtctggatctggcacaagctattctctgaccatctcaagaatggaggct gaagatgctgctacttattattgccaacagtggtcttcctttccaccaac cttcggtgcaggtaccaagctcgaactcaaaggtggaggaggaagcggag gaggcggtagtggtggaggtgggtcccaagttcagctgcaacagcccgga tctgatctggttcggcccggagctagcgtgaaactgtcttgcaaggctag cggatacactttcacccgctattggatgcactgggttaagcagcggccag gacacggactggagtggattggctatatctacccaggcagcgggacaagt aactacgatgagaaattcaagagtaaggctactctgactgtcgatacaag ttcctcaaccgcttacatgcagctctcttcactcaccagcgaagacagtg ctgtttattactgcaccagggaagctcggtacaccatggattattgggt caaggaacttctgtgacagtgtcaagcactacgaccctgcaccgcggcc gcctactcctgcacctacaatcgcaagtcagccactgagtctcagacccg aagcatgccgccctgctgcaggcggagctgtccatacacgcggactggac tttgcatgcgatatatacatctgggcaccactggccggcacttgcgcgt gctgctcctgtccctcgtgattaccctgtactgcaaacgcggcaggaaga agctcctgtatatctttaaacagcccttcatgaggccagtgcagaccact -continued
caagaggaagacggttgtagctgccggtttcccgaggaagaagagggagg ctgcgagctccgcgtgaagttctcccgctcagccgatgcacccgcctatc agcaagggcagaaccagctgtacaatgagctcaacctgggaagaagggag gaatatgacgttctggataaacggcgcggtcgcgatcccgaaatgggtgg gaagcctcgcaggaagaatcctcaggaagggctctacaatgagctgcaga aagacaaaatggcagaggcctattctgaaatcggcatgaagggcgagcgc cgcagaggcaaaggacacgacggcctgtaccagggcctgtctacagccac caaggacacctatgacgctctccacatgcaagccctgccaccaaggtga.

In some specific embodiments, the nucleic acid molecule includes the nucleic acid sequence shown in SEQ ID NO: 20, which is the coding gene of 27H4-CAR;

SEQ ID NO: 20:
atggctctgcctgttactgcactgctgctccctctggctctcctcctgca tgctgctcggcctgatatagtgatgtcccaaagcccatccagcctggccg tgtccgtcggcgaaaaggtgactatgagttgcaaatccagccaaagcctg ctgtacagtgacaaccaaaagaactacctggcatggtaccagcagaagcc tggacagtcaccaaagctcctcatctactgggctagcacaagggagagcg gcgtcccagacaggtttactggcagcgggagtggcaccgatttcaccctg acaataagctctgtcaaggccgaagacctcgctgtgtactattgtcagca gtattatacctatccctatactttcggtggagggaccaaactcgagatta aaggaggtggcggctctggaggtggaggttccggcggtggcggtagtgaa gtgcagctgcagcagagcgggcctgaactcgtgaaacctggtgcctccgt taaaatctcctgcaaggccagcggctactcattcacagggtatcacatgc attgggtgaagcagagccacgtcaaatcactggaatggatcggcaggatt aatccatacaatggcgctgcttcacataaccagaagttcaaggacaaagc caccctgactgtcgataagtcatcaagtacagcatacatggagctgcatt ccctgactagcgaggacagcgctgtttactactgcgcacgcgctgggac tacgacggtggctattacgccatggactactgggacaaggcaccagcgt cacagtttcaagtactacgaccctgcaccgcggccgcctactcctgcac ctacaatcgcaagtcagccactgagtctcagacccgaagcatgccgcct gctgcaggcggagctgtccatacacgcggactggactttgcatgcgatat atacatctgggcaccactggccggcacttgcggcgtgctgctcctgtccc tcgtgattaccctgtactgcaaacgcggcaggaagaagctcctgtatatc tttaaacagcccttcatgaggccagtgcagaccactcaagaggaagacgg ttgtagctgccggtttcccgaggaagaagagggaggctgcgagctccgcg tgaagttctcccgctcagccgatgcacccgcctatcagcaagggcagaac cagctgtacaatgagctcaacctgggaagaagggaggaatatgacgttct ggataaacggcgcggtcgcgatcccgaaatgggtgggaagcctcgcagga agaatcctcaggaagggctctacaatgagctgcagaaagacaaaatggca gaggcctattctgaaatcggcatgaagggcgagcgccgcagaggcaaagg acacgacggcctgtaccagggcctgtctacagccaccaaggacacctatg acgctctccacatgcaagccctgccaccaaggtga.

In some specific embodiments, the nucleic acid molecule includes the nucleic acid sequence shown in SEQ ID NO: 21, which is the coding gene of H27H4-CAR;

SEQ ID NO: 21:
atggatatgagggttcctgcacaactcctgggactcctcctgctctggct gagaggcgcaagatgtgatatccagatgacccagtctcctagtagcctgt ctgcctccgtcggcgatcgggtgaccattacttgcaaatcctcacagagc ctcctctactccgataatcagaagaactacctcgcctggtatcaacagaa accagggaaggcacctaagctgctgatctactgggctagtacccgcgaat ccggcgtccctagcaggttctctggcagcgggagcgggacagatttcacc ctcactatctcctccctgcagcctgaagacttcgcaacttactactgtca gcagtattatacttacccatacactttcggacagggaacaaaactggaaa ttaaaggtggaggtggatctggtggcggtggcagtggcggaggcggtct gaagtccaactggtgcagagcggtgcagaggtgaagaagcctggagcatc agtgaaggtgtcttgcaaagccagtggctacacattcactggatatcata tgcattgggttaggcaggcacccggccagcggctggagtggatgggaaga atcaacccttataatggcgctgcctctcacaatcaaaagtttaaggatcg ggtcactatcactcgggacacttccgcaagcaccgcctatatggagctga gcagcctgcgagtgaagacacagcagtctactactgtgctcgcggatgg gactatgacggcggttattatgccatggattactggggacagggcacact ggtcaccgtgagcagcactacgacccctgcaccgcggccgcctactcctg cacctacaatcgcaagtcagccactgagtctcagacccgaagcatgccgc cctgctgcaggcggagctgtccatacacgcggactggactttgcatgcga tatatacatctgggcaccactggccggcacttgcggcgtgctgctcctgt ccctcgtgattaccctgtactgcaaacgcggcaggaagaagctcctgtat atctttaaacagcccttcatgaggccagtgcagaccactcaagaggaaga cggttgtagctgccggtttcccgaggaagaagagggaggctgcgagctcc gcgtgaagttctcccgctcagccgatgcacccgcctatcagcaagggcag aaccagctgtacaatgagctcaacctgggaagaagggaggaatatgacgt tctggataaacggcgcggtcgcgatcccgaaatgggtgggaagcctcgca ggaagaatcctcaggaagggctctacaatgagctgcagaaagacaaaatg gcagaggcctattctgaaatcggcatgaagggcgagcgccgcagaggcaa aggacacgacggcctgtaccagggcctgtctacagccaccaaggacacct atgacgctctccacatgcaagccctgccaccaaggtga.

In some specific embodiments, the nucleic acid molecule includes the nucleic acid sequence shown in SEQ ID NO: 22, which is the coding gene of 1075.7-CAR;

SEQ ID NO: 22:
atggctctgcctgttactgcactcctcctcccactggcactcctcctgca

-continued
```
tgcagccaggcccgagaatgtgctgacacagtctccagccatcatgagcg cctctcccggtgaaaaggttactatgacctgtcgggcaagttcaaatgtg atctcctcttatgtgcactggtaccagcagcgctcaggtgcaagcccaaa gctgtggatctattccacttctaacctggcctccggtgtcccagccgct tttctggaagcgggtcaggcacctcatactccctcaccatatcaagtgtg gaagctgaggatgcagctacttactactgccaacagtactctggttaccc actgaccttcggagccgggacaaagctggaactgggaggaggcgggtccg gcggtggagggtccggaggtggcgggtccgatatccagctgcaagagtca ggcccaggcctggtcaaaccttcccaaagcctgagtctcacctgttccgt gacaggttattccattactagcgcatattactggaactggataagacaat tcccaggaaacaaactcgagtggatgggctacatctcatacgacgggcgg aacaactataacccatccctgaagaatcggatttccatcactagagacac atccaagaaccagttctttctcaagctgaatagcgtgacaactgaggata cagcaacctactattgcgccaaggaaggagactatgatgttggcaactat tatgcaatggactattgggacagggcacatcagtgaccgtgagcagcac tacgaccctgcaccgcggccgcctactcctgcacctacaatcgcaagtc agccactgagtctcagacccgaagcatgccgcctgctgcaggcggagct gtccatacacgcggactggactttgcatgcgatatatacatctgggcacc actggccggcacttgcggcgtgctgctcctgtccctcgtgattaccctgt actgcaaacgcggcaggaagaagctcctgtatatctttaaacagcccttc atgaggccagtgcagaccactcaagaggaagacggttgtagctgccggtt tcccgaggaagaagggaggctgcgagctccgcgtgaagttctcccgct cagccgatgcacccgcctatcagcaagggcagaaccagctgtacaatgag ctcaacctgggaagaagggaggaatatgacgttctggataaacggcgcgg tcgcgatcccgaaatgggtgggaagcctcgcaggaagaatcctcaggaag ggctctacaatgagctgcagaaagacaaaatggcagaggcctattctgaa atcggcatgaagggcgagcgccgcagaggcaaaggacacgacggcctgta ccagggcctgtctacagccaccaaggacacctatgacgctctccacatgc aagccctgccaccaaggtga.
```

In a third aspect, the present application provides an expression vector comprising the nucleic acid molecule described in the second aspect.

Preferably, the expression vector is a viral vector or a non-viral vector containing the nucleic acid molecule described in the second aspect.

Preferably, the viral vector includes any one of a lentiviral vector, a retroviral vector or an adeno-associated virus vector.

Preferably, the non-viral vector includes any one of a Piggybac transposon system, a Sleeping Beauty transposon system or a nanocarrier.

In a fourth aspect, the present application provides a recombinant lentivirus prepared from mammalian cells transfected with the expression vector described in the third aspect and a helper plasmid.

In a fifth aspect, the present application provides a chimeric antigen receptor immune cell expressing the chimeric antigen receptor targeting CLL1 described in the first aspect.

In the present application, immune cells expressing the chimeric antigen receptor targeting CLL1 use the antigen binding domain of the chimeric antigen receptor to target CLL1-positive tumor cells and secrete cytokine IFN-γ by exerting the killing function of immune cells to achieve the killing effect on CLL1 tumors at different effector-to-target ratios.

Preferably, the nucleic acid molecule described in the second aspect is integrated into the genome of the chimeric antigen receptor immune cell.

Preferably, the chimeric antigen receptor immune cell includes the expression vector described in the third aspect and/or the recombinant lentivirus described in the fourth aspect.

Preferably, the immune cell includes any one of a T cell, an NK cell or a macrophage.

Preferably, the T cell includes an αβT cell and/or a γδT cell.

In a sixth aspect, the present application provides a pharmaceutical composition comprising the chimeric antigen receptor immune cell described in the fifth aspect.

Preferably, the pharmaceutical composition further includes any one or a combination of at least two of a pharmaceutically acceptable carrier, excipient or diluent.

In a seventh aspect, the present application provides use of the chimeric antigen receptor targeting CLL1 described in the first aspect, the nucleic acid molecule described in the second aspect, the expression vector described in the third aspect, the recombinant lentivirus described in the fourth aspect, the chimeric antigen receptor immune cell described in the fifth aspect, or the pharmaceutical composition described in the sixth aspect in the preparation of a medicine for treating a malignant tumor.

Preferably, the malignant tumor includes acute myeloid leukemia.

In an eighth aspect, the present application provides a method of treating cancer, comprising administering to a patient an effective dose of the chimeric antigen receptor immune cells described in the fifth aspect or the pharmaceutical composition described in the sixth aspect, and administering one or more antitumor agents simultaneously, separately or sequentially.

Preferably, the cancer includes acute myeloid leukemia.

Compared with the existing art, the present application has beneficial effects described below.

(1) The present application uses anti-CLL1 antibody as the antigen binding domain to construct CAR molecules. T cells expressing CAR targeting CLL1 rely on CAR elements to kill CLL1 positive tumor cells under different effector-to-target ratios, wherein, H27H4-CAR-T has the best killing function;

(2) After co-cultured with CLL1 positive tumor cells, the CAR-T cells targeting CLL1 of the present application secrete a large amount of cytokine IFN-γ, which proves the specific killing effect of CAR-T on CLL1 tumor cells.

DETAILED DESCRIPTION

In order to further illustrate the technical means adopted by the present application and effects thereof, the application will be further described below in conjunction with examples and drawings. It can be understood that the specific embodiments described here are only used to explain the application, but not to limit the application.

If the specific technology or conditions are not indicated in the examples, the embodiments shall be carried out according to the technology or conditions described in the literature in the field or according to the product specification. The reagents or instruments used without indicating the manufacturer are all conventional products that can be purchased through formal channels.

Example 1 Source of Anti-CLL1 Antibodies

In the present example, anti-CLL1 antibodies 19C1, 23D7, 27H4, humanized 27H4 (H27H4) and 1075.7 (U.S. Pat. No. 8,536,310B2) were selected as antigen binding domains for the construction of CAR molecules, wherein, 19C1 included the variable regions shown in SEQ ID NO: 1-2, 23D7 included the variable regions shown in SEQ ID NOs: 3-4, 27H4 included the variable regions shown in SEQ ID NOs: 5-6, H27H4 included the variable regions shown in SEQ ID NOs: 7-8, and 1075.7 included the variable regions shown in SEQ ID NOs: 11-12.

Example 2 Expression of CLL1 by Tumor Cells

In the present example, FITC anti-human CD371 (CLL1) antibody (biolegend BioLegend Inc.) was incubated with target cells Jurkat and KG-1a, separately. Then the expression of CLL1 by the target cells was detected by flow cytometry.

Figure 1:
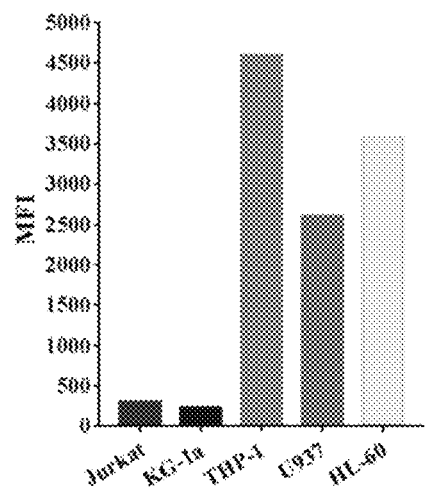
FIG. 1 shows the expression of CLL1 in different tumor cells.

The results are shown in FIG. 1. THP-1, U937 and HL-60 were CLL1 positive cells, and Jurkat and KG-1a were CLL1 negative cells.

Example 3 Design of Chimeric Antigen Receptor

Figure 2:
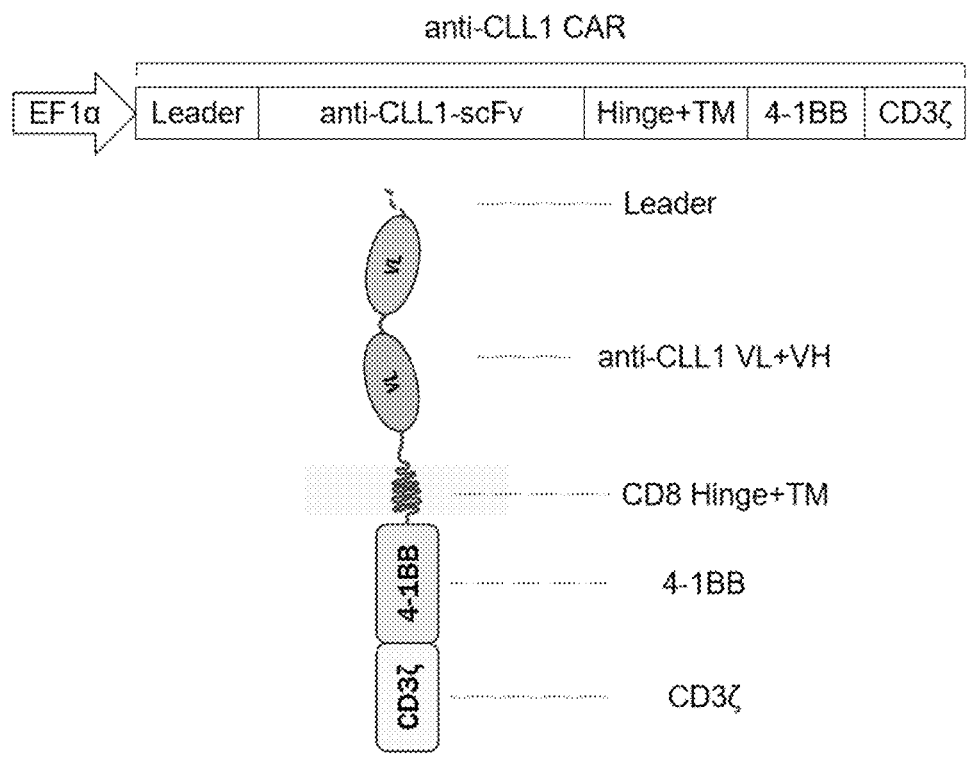
FIG. 2 shows a schematic diagram of the structure of a chimeric antigen receptor targeting CLL1.

In the present example, a chimeric antigen receptor targeting CLL1 was designed. The schematic diagram of the structure is shown in FIG. 2, including the CD8α signal peptide, single-chain antibody that specifically binds to CLL1 antigen (Anti-CLL1 scFv), CD8α hinge region (Hinge) and transmembrane region (Transmembrane), 4-1BB costimulatory domain and CD3ζ signaling domain. The specific CAR molecules are as follows.
(1) 19C1-CAR: CD8α signal peptide, Anti-CLL1 scFv (19C1), CD8α Hinge+TM, 4-1BB and CD3ζ;
(2) 23D7-CAR: CD8α signal peptide, Anti-CLL1 scFv (23D7), CD8α Hinge+TM, 4-1BB and CD3ζ;
(3) 27H4-CAR: CD8α signal peptide, Anti-CLL1 scFv (27H4), CD8α Hinge+TM, 4-1BB and CD3ζ;
(4) H27H4-CAR: IgGκ light chain signal peptide, Anti-CLL1 scFv (H27H4), CD8α Hinge+TM, 4-1BB and CD3ζ;
(5) 1075.7-CAR: CD8α signal peptide, Anti-CLL1 scFv (1075.7), CD8α Hinge+TM, 4-1BB and CD3ζ;

wherein, the amino acid sequence of the CD8α signal peptide is shown in SEQ ID NO: 23, and the nucleic acid sequence is shown in SEQ ID NO: 24; the amino acid sequence of the IgGκ light chain signal peptide is shown in SEQ ID NO: 25, and the nucleic acid sequence is shown in SEQ ID NO: 26; the amino acid sequence of CD8α Hinge is shown in SEQ ID NO: 27, and the nucleic acid sequence is shown in SEQ ID NO: 28; the amino acid sequence of CD8α TM is shown in SEQ ID NO: 29, and the nucleic acid sequence is shown in SEQ ID NO: 30; the amino acid sequence of 4-1BB is shown in SEQ ID NO: 31, and the nucleic acid sequence is shown in SEQ ID NO: 32; the amino acid sequence of CD3 is shown in SEQ ID NO: 33, and the nucleic acid sequence is shown in SEQ ID NO: 34;

SEQ ID NO: 23:
MALPVTALLLPLALLLHAARP;

SEQ ID NO: 24:
atggcactgccagtgacagccctgctgctgccactggccctgctgctgca cgcagcacgccct;

SEQ ID NO: 25:
MDMRVPAQLLGLLLLWLRGARC;

SEQ ID NO: 26:
atggatatgagggttcctgcacaactcctgggactcctcctgctctggct gagaggcgcaagatgt;

SEQ ID NO: 27:
TTTPAPRPPTPAPTIASQPLSLRPEACRPAAGGAVHTRGLDFACD;

SEQ ID NO: 28:
accacgacgccagcgccgcgaccaccaacaccggcgcccaccatcgcgtc gcagcccctgtccctgcgcccagaggcgtgccggccagcggcgggggcg cagtgcacacgagggggctggacttcgcctgtgat;

SEQ ID NO: 29:
IYIWAPLAGTCGVLLLSLVITLYC;

SEQ ID NO: 30:
atctacatctgggcgcccttggccgggacttgtggggtccttctcctgtc actggttatcacccttactgc;

SEQ ID NO: 31:
KRGRKKLLYIFKQPFMRPVQTTQEEDGCSCRFPEEEEGGCEL;

SEQ ID NO: 32:
aagagaggcaggaagaagctgctgtatatcttcaagcagcccttcatgcg ccccgtgcagacaacccaggaggaggacggctgc agctgtcggttcccagaggaggaggagggaggatgtgagctg;

SEQ ID NO: 33:
RVKFSRSADAPAYQQGQNQLYNELNLGRREEYDVLDKRRGRDPEMGGKPR

RKNPQEGLYNELQKDKMAEAYSEIGMKGERRRGKGHDGLYQGLSTATKDT

YDALHMQALPPR;

SEQ ID NO: 34:
agggtgaagttttctcggagcgccgatgcaccagcatatcagcagggaca gaatcagctgtacaacgagctgaatctgggcaggcgcgaggagtacgacg tgctggataagcggagaggcagagatcccgagatgggaggcaagccaagg -continued
aggaagaaccctcaggagggcctgtataatgagctgcagaaggacaagat ggccgaggcctactctgagatcggcatgaagggagagcggagaaggggca agggacacgatggcctgtatcagggcctgagcacagccaccaaggacacc tacgatgcactgcacatgcaggccctgccacctagg.

Example 4 Construction of an Expression Vector of the Chimeric Antigen Receptor Targeting CLL1

(1) According to the CAR molecule designed in Example 3, the CAR encoding gene was codon-optimized to promote its high-efficiency expression in human cells, and the whole gene of the CAR encoding gene was synthesized (Guangzhou Ige BIOTECHNOLOGY Co., Ltd.);

(2) The full-length CAR gene and the empty vector pCDH-EF1-MCS were digested with EcoRI and BamHI. After digestion in a 37° C. water bath for 30 min, DNA electrophoresis was performed on a 1.5% agarose gel, and agarose gel purification kit (Tiangen BIOTECH Co., Ltd.) was used to purify and recover the digested products;

(3) The ligation system shown in Table 1 was prepared, and the CAR gene fragment and linearized pCDH-EF1-MCS were ligated at 22° C. for 1 h, and the ligation product was directly transformed into Stb13 *E. coli* competent cells. 200 μL of the transformed product was coated on an ampicillin-resistant LB plate which was inverted and incubated overnight in an incubator at 37° C. The next morning, 3 single clones were randomly selected for colony PCR identification, and positive clones were identified by sequencing;

TABLE 1

| Component | Addition Amount |
|---|---|
| Linearized pCDH-EF1-MCS vector | 50 ng |
| CAR gene | 150 ng |
| T4 DNA ligation buffer | 2 μL |
| T4 DNA ligase (NEB) | 1 μL |
| ddH$_2$O | To 20 μL |

Figure 3A:
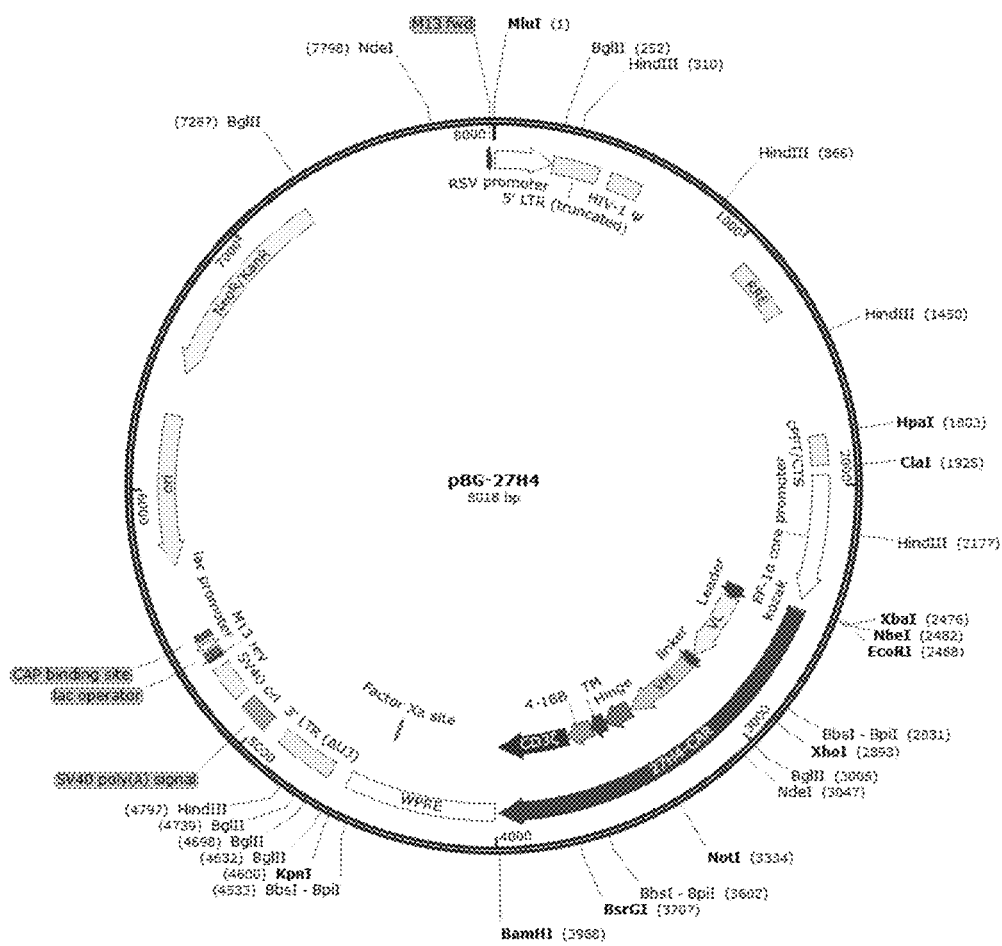
FIG. 3A shows a map of the lentiviral expression vector containing the H27H4 CAR gene.
Figure 3B:
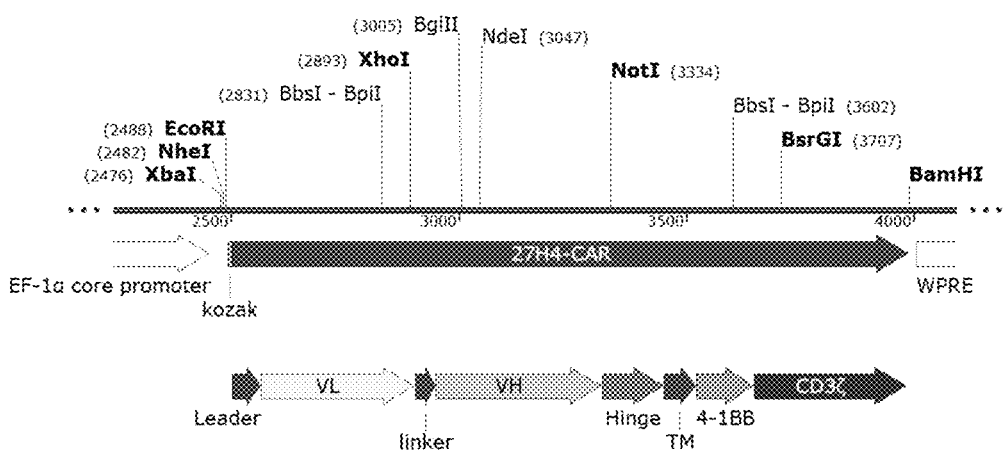
FIG. 3B shows the position of the H27H4 CAR in the lentiviral expression vector.

Illustratively, the constructed lentiviral expression vector pBG-27H4 containing the 27H4 CAR gene is shown in FIG. 3A and FIG. 3B.

Example 5 Lentivirus Packaging

In the present example, a four-plasmid system was used to perform lentiviral packaging on the lentiviral expression vector constructed in Example 4. The specific steps are as follows:

(1) the four-plasmid system consisting of a lentiviral expression vector, a helper plasmid gag/pol, a Rev, and a VSV-G was mixed with a PEI transfection reagent, then added to a certain volume of serum-free DMEM, mixed and placed for 15 min;

(2) the above mixture was added to a T75 cell culture flask with 293T cells, mixed gently, and cultured in a 37° C., 5% CO$_2$ cell incubator for 6 hours;

(3) after 6 h, the culture medium was replaced with fresh medium and the culture was continued with the addition of 10 mM sodium butyrate solution; the lentivirus culture supernatant was collected after 72 h for purification assay.

Example 6 Acquisition and Expansion of T Cells 30 mL of whole blood was collected from each volunteer, and the peripheral blood was diluted with saline in proportion of 1:1; Ficoll's lymphocyte isolate was added to a centrifuge tube, and the diluted peripheral blood was slowly added and centrifuged at 1500 rpm for 30 min, and the PBMC layer was gently aspirated and transferred into another centrifuge tube;

PBMCs were washed several times with saline and transferred to X-VIVO medium (containing 50 ng/mL OKT3, 300 IU/mL IL-2) for culture. PBMCs were isolated and activated with X-VIVO (containing 50 ng/mL OKT3, 300 IU/mL IL-2), and the medium was changed to X-VIVO containing 300 IU/mL for expanded culture after 2 days. Then cells were counted every two days and the medium was replaced by fresh X-VIVO containing 300 IU/mL to maintain the cell concentration at $(0.5-1) \times 10^6$ cells/mL. The observation lasted for ten days.

Example 7 Preparation of CAR-T Cells

In the present example, RetroNectin® (Recombinant Human Fibronectin Fragment) was used to improve the infection efficiency of lentivirus on T cells, and the steps were as follows:

30 μg RetroNectin® was coated on a 6-well plate and maintained in a 37° C. cell incubator for 2 h; RetroNectin® was pipetted, the coated 6-well plate was blocked with Hank's solution containing 2.5% BSA and placed in a cell incubator at 37° C. for 0.5 h; the blocking solution was pipetted, the 6-well plate was washed with Hank's solution containing 2% Hepes, added with X-VIVO medium, added with appropriate amount of lentivirus solution, centrifuged at 2000 g for 2 hours, and the supernatant was discarded; $1 \times 10^6$ T cells (CD3 positive >90%) were added, centrifuged at 1000 g for 10 min, and cultured in a cell incubator at 37° C., 5% CO$_2$, and a certain humidity. Repeat the above steps the next day.

The amount of lentivirus added is shown in Table 2.

TABLE 2

| CAR Lentivirus | Virus Infection Titer (TU/mL) | Number of Starting Cells (pcs) | MOI | Lentivirus Usage Amount (μL) |
|---|---|---|---|---|
| 19C1-CAR | 2.41E+07 | 4.00E+06 | 5 | 830.91 |
| 23D7-CAR | 4.70E+07 | 4.00E+06 | 5 | 425.99 |
| 27H4-CAR | 1.76E+08 | 4.00E+06 | 5 | 113.51 |
| H27H4-CAR | 3.91E+08 | 4.00E+06 | 5 | 51.22 |
| 1075.7-CAR | 9.88E+07 | 4.00E+06 | 5 | 202.43 |

Flow cytometry was used to detect the expression or CAR molecules on the surface of T cells, and the CLL1-Fc fusion protein (Acrobiosystems) was used to detect the expression of CAR. The secondary antibody was FITC-Labeled anti-human Fc, and T cell (T mock) not transfected with CAR was used as a negative control.

Figure 4:
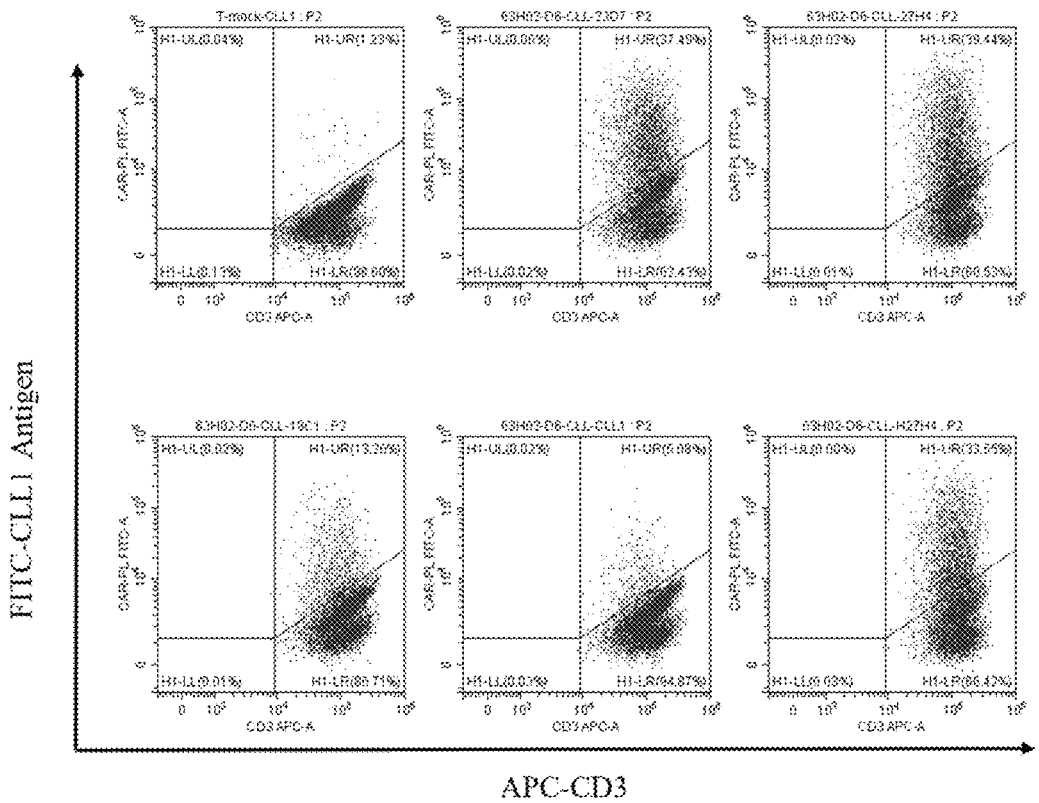
FIG. 4 shows the positive rate of CAR expression in different CAR-T cells.

The results are shown in FIG. 4 and Table 3. The positive rate of CAR expression in 19C1-CAR-T cells was 13.28%, the positive rate of CAR expression in 23D7-CAR-T cells was 37.49%, the positive rate of CAR expression in 27H4-CAR-T cells was 39.44%, the positive rate of CAR expression in H27H4-CAR-T cells was 33.59%, and the positive rate of CAR expression in 1075.7-CAR-T cells was 5.09%.

TABLE 3

| T cell type | T mock | 19C1 | 23D7 | 27H4 | H27H4 | 1075.7 |
|---|---|---|---|---|---|---|
| CAR Positive Rate | 1.23% | 13.28% | 37.49% | 39.44% | 33.59% | 5.09% |

Example 8 The Killing Function of CAR-T Cells

In the present example, the xCELLigence® Real Time Cell Analysis (RTCA) was used to automatically detect the cell killing effect in the whole process. The xCELLigence® Real Time Cell Analyzer (RTCA) was based on microelectronic impedance technology. There were a large number of micro-gold electrodes integrated at the bottom of the E-plate. When the adherent cells adhered to the micro-gold electrodes, the number, diameter and adhesion ability of the cells will affect the current conduction between the micro-gold electrodes, thereby causing the impedance value to change. This change was extremely delicate and sensitive. Under the toxic negative effect, the cell directly or indirectly affected the impedance value. Therefore, xCELLigence® can monitor the cytotoxic effects caused by molecular targets.

Steps are as follows:
(1) the anti-CD40 was diluted with a certain volume of 1xTether Buffer, 50 μL of diluted anti-CD40 was added to each well of an E-Plate View 96-well plate as a coating solution, incubated at room temperature in the dark for 3 hours, and each group was set with three replicate wells;
(2) the coating solution was discarded, the wells were gently washed twice with 200 μL PBS, 50 UL of 1640 medium containing 2% FBS was added to each well, and the E-Plate View 96-well plate was placed in the xCELLigence® instrument (the instrument was placed in the incubator 1 h in advance) and equilibrated at 37° C. for 1 h to measure the background values;
(3) Raji cells stably overexpressing CLL1 (Raji-CLL1) were used as a target cell, the target cell suspension was prepared and cell density was measured, 50,000 cells/ 50 μL were added to each well, the final volume of each well was 100 μL, incubated at room temperature for 30 min. The E-Plate View 96-well plate was put back into the instrument, and the software was operated for data collection, and electrical impedance was detected every 5 min for 2 h;
(4) effector cell suspensions (i.e. CAR-T cells) and negative control cell suspensions (i.e. untransfected T cells) with different effector-to-target ratios were prepared separately. 50 μL of diluted effector cell suspension or negative control cell suspension was added to each well, 50 μL of culture medium was added to the blank control group and 50 μL of 1× Cytolysis Solution was added to the positive control group. Then all groups were incubated for 30 min at room temperature to uniformly distribute the effector cells on the fixed target cells;
(5) the E-Plate View 96-well plate was put back into the instrument and the software was operated for data collection, and the electrical impedance was detected every 5 min for 16 h. The data were saved and analyzed after the experiment.

Figure 5:
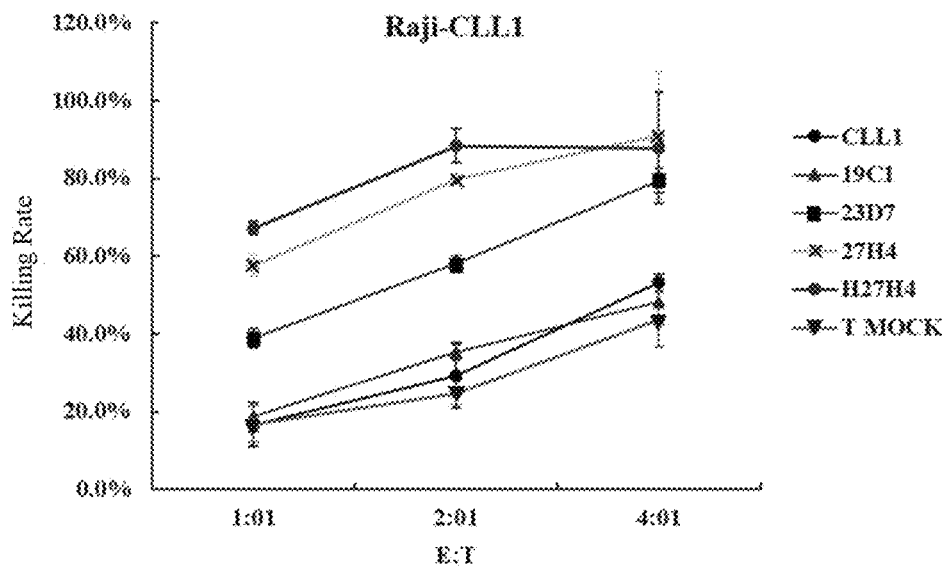
FIG. 5 shows the killing rate of CAR-T targeting CLL1 on Raji-CLL1 cells.

The results are shown in FIG. 5. After 19C1-CAR-T, 23D7-CAR-T, 27H4-CAR-T, H27H4-CAR-T or 1075.7-CAR-T were incubated with Raji-CLL1 for 16 h under different effector-to-target ratios (1:1, 2:1, 4:1), all of them could effectively kill Raji-CLL1 cells. The larger the effector-to-target ratio, the stronger the killing ability. Wherein, H27H4-CAR-T had the strongest killing ability, 27H4-CAR-T had similar killing ability to H27H4-CAR-T, 23D7-CAR-T was inferior, 19C1-CAR-T and 1075.7-CAR-T had relatively weak killing ability, and the untransfected CAR T mock could not kill Raji-CLL1, indicating that the killing activity of anti-CLL1 CAR-T was dependent on the CAR element.

Example 9 Secretion of IFN-γ by Co-Cultured CAR-T Cells and Tumor Cells

In the present example, the Human IFN-γ ELISA kit (Neobioscience) was used to detect the concentration of IFN-γ cytokine released by CAR-T cells, and the secretion of IFN-γ was analyzed after CAR-T and target cells were co-cultured. Specifically, CLL1 positive cells Raji-CLL1, HL60, U937 were used as positive target cells, and CLL1 negative cells Raji were used as negative target cells.

CAR-T cells and different target cells were incubated for 16 h according to an effector-to-target ratio of 1:1, and the supernatant was taken to detect the secretion of IFN-γ in the culture supernatant by enzyme-linked immunosorbent assay (ELISA). The principle of the assay was based on a double antibody sandwich ELISA in which anti-human IFN-γ antibody was coated on an enzyme standard plate, human IFN-γ in the sample or standard was bound to the coating antibody during the experiment, and the free components were washed away; biotinylated anti-human IFN-γ antibody and horseradish peroxidase labeled avidin were added sequentially, the anti-human IFN-γ antibody bound to human IFN-γ that bound to the coating antibody, and biotin specifically bound to avidin to form an immune complex, and the free components were washed away; the chromogenic substrate (TMB) was added, which appeared blue under the catalysis of horseradish peroxidase, and turned yellow after adding the termination solution, and the OD value was measured at 450 nm with Microplate Reader, and there was a positive correlation between IFN-γ concentration and OD450, and the concentration of IFN-γ in the sample was calculated by plotting the standard curve.

Figure 6:
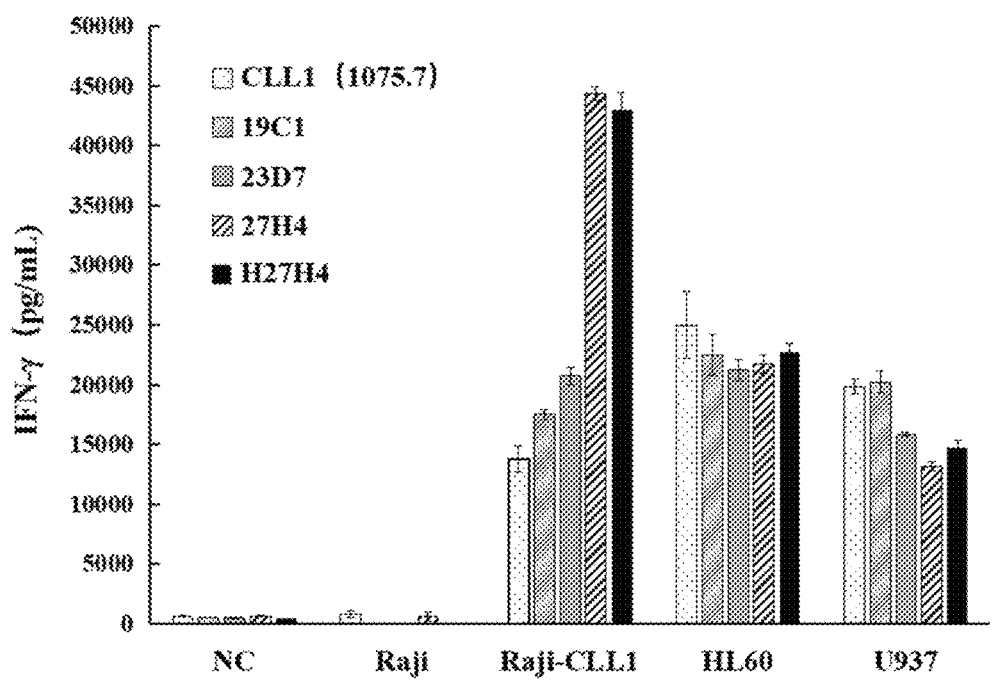
FIG. 6 shows the IFN-γ secretion of CAR-T targeting CLL1 to kill target cells.

The results are shown in FIG. 6. 19C1-CAR-T, 23D7-CAR-T, 27H4-CAR-T, H27H4-CAR-T or 1075.7-CAR-T released large amounts of IFN-γ after co-culture with Raji-CLL1, HL60 or U937, while no large amount of IFN-γ was released after co-culture with Raji cells, indicating that the killing effect of CAR-T cells targeting CLL1 is specific.

In summary, the CAR-T cells targeting CLL1 of the present application have a significant killing effect on CLL1 positive tumor cells at different effector-to-target ratios, secrete a large amount of cytokine IFN-γ after co-cultured with tumor cells, and have promising applications in the field of CLL1 positive tumor therapy.

The applicant has stated that although the detailed method of the present application is described through the examples described above, the present application is not limited to the detailed method described above, which means that implementation of the present application does not necessarily depend on the detailed method described above. It should be apparent to those skilled in the art that any improvements made to the present application, equivalent replacements of raw materials of the product of the present application, additions of adjuvant ingredients to the product of the present application, and selections of specific manners, etc., all fall within the protection scope and the disclosed scope of the present application.

What is claimed is:

1. A chimeric antigen receptor targeting CLL1, comprising an antigen binding domain, a hinge region, a transmembrane domain and a signal transduction domain;
   wherein the antigen binding domain is an anti-CLL1 antibody, wherein the antigen binding domain comprises the amino acid sequence shown in SEQ ID NO: 5 and SEQ ID NO: 6; or
   the antigen binding domain comprises the amino acid sequence shown in SEQ ID NO: 7 and the amino acid sequence shown in one of SEQ ID NO: 8 to 10.

2. The chimeric antigen receptor targeting CLL1 according to claim 1, wherein the hinge region comprises a CD8a hinge region.

3. The chimeric antigen receptor targeting CLL1 according to claim 1, wherein the transmembrane domain comprises a CD8a transmembrane region and/or a CD28 transmembrane region.

4. The chimeric antigen receptor targeting CLL1 according to claim 1, wherein the signal transduction domain comprises CD3ζ.

5. The chimeric antigen receptor targeting CLL1 according to claim 4, wherein the signal transduction domain further includes any one or a combination of at least two of 4-1BB, CD28 intracellular region, DAP10 and OX40.

6. The chimeric antigen receptor targeting CLL1 according to claim 1, wherein the chimeric antigen receptor targeting CLL1 further comprises a signal peptide.

7. The chimeric antigen receptor targeting CLL1 according to claim 6, wherein the signal peptide comprises a CD8α signal peptide and/or an IgGκ light chain signal peptide.

8. The chimeric antigen receptor targeting CLL1 according to claim 1, wherein, the chimeric antigen receptor targeting CLL1 comprises a signal peptide, an anti-CLL1 antibody, a CD8α hinge region, a CD8α transmembrane region, 4-1BB and CD3ζ.

9. The chimeric antigen receptor targeting CLL1 according to claim 1, wherein:
   the chimeric antigen receptor targeting CLL 1 comprises the amino acid sequence shown in SEQ ID NO: 15; or
   the chimeric antigen receptor targeting CLL 1 comprises the amino acid sequence shown in SEQ ID NO: 16.

10. A nucleic acid molecule, comprising a coding gene of the chimeric antigen receptor targeting CLL1 according to claim 1.

11. The nucleic acid molecule according to claim 10, wherein:
    the nucleic acid molecule comprises the nucleic acid sequence shown in SEQ ID NO: 20; or
    the nucleic acid molecule comprises the nucleic acid sequence shown in SEQ ID NO: 21.

12. An expression vector, comprising the nucleic acid molecule of claim 10; wherein:
    the expression vector is a viral vector or a non-viral vector containing the nucleic acid molecule; wherein:
    the viral vector comprises any one of a lentiviral vector, a retroviral vector or an adeno-associated viral vector; or
    the non-viral vector comprises any one of a Piggybac transposon system, a Sleeping Beauty transposon system or a nanocarrier.

13. A recombinant lentivirus, wherein the recombinant lentivirus is prepared from a mammalian cell transfected with the expression vector of claim 12 and a helper plasmid.

14. A chimeric antigen receptor immune cell, wherein the chimeric antigen receptor immune cell expresses the chimeric antigen receptor targeting CLL1 according to claim 1.

15. A pharmaceutical composition, comprising the chimeric antigen receptor immune cell of claim 14; and
    a pharmaceutically acceptable carrier, excipient or diluent.

16. The pharmaceutical composition according to claim 15, wherein the pharmaceutical composition further comprises at least two of a pharmaceutically acceptable carrier, excipient or diluent.

17. A method for treating cancer, comprising administering to a patient an effective dose of the pharmaceutical composition according to claim 15, wherein the cancer comprises acute myeloid leukemia.

18. A method for treating cancer, comprising administering to a patient an effective dose of the chimeric antigen receptor immune cells according to claim 14, wherein the cancer comprises acute myeloid leukemia.

19. The chimeric antigen receptor immune cell according to claim 14, wherein the immune cell comprises any one of a T cell, an NK cell and a macrophage.

20. The chimeric antigen receptor immune cell according to claim 19, wherein the T cell comprises an αβT cell and/or a γσT cell.

* * * * *

SEQUENCE LISTING

<160> NUMBER OF SEQ ID NOS: 34

<210> SEQ ID NO 1
<211> LENGTH: 121
<212> TYPE: PRT
<213> ORGANISM: Artificial sequence
<220> FEATURE:
<223> OTHER INFORMATION: the antigen binding domain

<400> SEQUENCE: 1

Gln Val Gln Leu Gln Gln Ser Gly Ala Glu Leu Met Lys Pro Gly Ala
1               5                   10                  15

Ser Val Lys Ile Ser Cys Lys Ala Thr Gly Tyr Thr Phe Ser Ser Tyr
            20                  25                  30

Trp Ile Glu Trp Val Lys Gln Arg Pro Gly His Gly Leu Glu Trp Ile
        35                  40                  45

Gly Glu Ile Phe Pro Gly Ser Gly Ser Ile Lys Tyr Asn Glu Lys Phe
    50                  55                  60

Lys Gly Lys Ala Thr Phe Thr Ala Asp Thr Ser Ser Asn Thr Ala Tyr
65                  70                  75                  80

Met Gln Leu Ser Ser Leu Thr Ser Glu Asp Ser Ala Val His Tyr Cys
                85                  90                  95

Ala Arg Gly Gly Thr Tyr Asn Asp Tyr Ser Leu Phe Asp Tyr Trp Gly
            100                 105                 110

Gln Gly Thr Thr Leu Thr Val Ser Ser
        115                 120

<210> SEQ ID NO 2
<211> LENGTH: 106
<212> TYPE: PRT
<213> ORGANISM: Artificial sequence
<220> FEATURE:
<223> OTHER INFORMATION: the antigen binding domain

<400> SEQUENCE: 2

Gln Ile Val Leu Thr Gln Ser Pro Ala Ile Met Ser Ala Ser Pro Gly
1               5                   10                  15

Glu Lys Val Thr Met Thr Cys Ser Ala Ser Ser Ser Val Ser Tyr Met
            20                  25                  30

Tyr Trp Tyr Gln Gln Lys Pro Gly Ser Ser Pro Arg Leu Leu Ile Phe
        35                  40                  45

Asp Thr Ser Asn Leu Ala Ser Gly Val Pro Val Arg Phe Ser Gly Ser
    50                  55                  60

Gly Ser Gly Thr Ser Tyr Ser Leu Thr Ile Ser Arg Met Glu Ala Glu
65                  70                  75                  80

Asp Ala Ala Thr Tyr Tyr Cys Gln Gln Trp Ser Ser Tyr Pro Leu Thr
                85                  90                  95

Phe Gly Ala Gly Thr Lys Leu Glu Leu Lys
            100                 105

<210> SEQ ID NO 3
<211> LENGTH: 117
<212> TYPE: PRT
<213> ORGANISM: Artificial sequence
<220> FEATURE:
<223> OTHER INFORMATION: the antigen binding domain

<400> SEQUENCE: 3

Gln Val Gln Leu Gln Gln Pro Gly Ser Asp Leu Val Arg Pro Gly Ala
1               5                   10                  15

Ser Val Lys Leu Ser Cys Lys Ala Ser Gly Tyr Thr Phe Thr Arg Tyr
            20                  25                  30

Trp Met His Trp Val Lys Gln Arg Pro Gly His Gly Leu Glu Trp Ile
        35                  40                  45

Gly Tyr Ile Tyr Pro Gly Ser Gly Thr Ser Asn Tyr Asp Glu Lys Phe
    50                  55                  60

Lys Ser Lys Ala Thr Leu Thr Val Asp Thr Ser Ser Thr Ala Tyr
65                  70                  75                  80

Met Gln Leu Ser Ser Leu Thr Ser Glu Asp Ser Ala Val Tyr Tyr Cys
                85                  90                  95

Thr Arg Glu Ala Arg Tyr Thr Met Asp Tyr Trp Gly Gln Gly Thr Ser
            100                 105                 110

Val Thr Val Ser Ser
            115

<210> SEQ ID NO 4
<211> LENGTH: 106
<212> TYPE: PRT
<213> ORGANISM: Artificial sequence
<220> FEATURE:
<223> OTHER INFORMATION: the antigen binding domain

<400> SEQUENCE: 4

Gln Ile Val Leu Thr Gln Ser Pro Ala Ile Met Ser Ala Ser Pro Gly
1               5                   10                  15

Glu Lys Val Thr Met Thr Cys Ser Ala Ser Ser Val Ser Tyr Ile
            20                  25                  30

Tyr Trp Tyr Gln Gln Lys Pro Gly Ser Ser Pro Gly Leu Leu Ile Tyr
        35                  40                  45

Asp Thr Ser Asn Leu Ala Ser Gly Val Pro Val Arg Phe Ser Gly Ser
    50                  55                  60

Gly Ser Gly Thr Ser Tyr Ser Leu Thr Ile Ser Arg Met Glu Ala Glu
65                  70                  75                  80

Asp Ala Ala Thr Tyr Tyr Cys Gln Gln Trp Ser Ser Phe Pro Pro Thr
                85                  90                  95

Phe Gly Ala Gly Thr Lys Leu Glu Leu Lys
            100                 105

<210> SEQ ID NO 5
<211> LENGTH: 122
<212> TYPE: PRT
<213> ORGANISM: Artificial sequence
<220> FEATURE:
<223> OTHER INFORMATION: the antigen binding domain

<400> SEQUENCE: 5

Glu Val Gln Leu Gln Gln Ser Gly Pro Glu Leu Val Lys Pro Gly Ala
1               5                   10                  15

Ser Val Lys Ile Ser Cys Lys Ala Ser Gly Tyr Ser Phe Thr Gly Tyr
            20                  25                  30

His Met His Trp Val Lys Gln Ser His Val Lys Ser Leu Glu Trp Ile
        35                  40                  45

Gly Arg Ile Asn Pro Tyr Asn Gly Ala Ala Ser His Asn Gln Lys Phe
    50                  55                  60

Lys Asp Lys Ala Thr Leu Thr Val Asp Lys Ser Ser Ser Thr Ala Tyr
65                  70                  75                  80

Met Glu Leu His Ser Leu Thr Ser Glu Asp Ser Ala Val Tyr Tyr Cys

```
                 85                  90                  95
Ala Arg Gly Trp Asp Tyr Asp Gly Gly Tyr Tyr Ala Met Asp Tyr Trp
            100                 105                 110

Gly Gln Gly Thr Ser Val Thr Val Ser Ser
        115                 120

<210> SEQ ID NO 6
<211> LENGTH: 113
<212> TYPE: PRT
<213> ORGANISM: Artificial sequence
<220> FEATURE:
<223> OTHER INFORMATION: the antigen binding domain

<400> SEQUENCE: 6

Asp Ile Val Met Ser Gln Ser Pro Ser Ser Leu Ala Val Ser Val Gly
1               5                   10                  15

Glu Lys Val Thr Met Ser Cys Lys Ser Ser Gln Ser Leu Leu Tyr Ser
            20                  25                  30

Asp Asn Gln Lys Asn Tyr Leu Ala Trp Tyr Gln Gln Lys Pro Gly Gln
        35                  40                  45

Ser Pro Lys Leu Leu Ile Tyr Trp Ala Ser Thr Arg Glu Ser Gly Val
    50                  55                  60

Pro Asp Arg Phe Thr Gly Ser Gly Ser Gly Thr Asp Phe Thr Leu Thr
65                  70                  75                  80

Ile Ser Ser Val Lys Ala Glu Asp Leu Ala Val Tyr Tyr Cys Gln Gln
                85                  90                  95

Tyr Tyr Thr Tyr Pro Tyr Thr Phe Gly Gly Gly Thr Lys Leu Glu Ile
            100                 105                 110

Lys

<210> SEQ ID NO 7
<211> LENGTH: 122
<212> TYPE: PRT
<213> ORGANISM: Artificial sequence
<220> FEATURE:
<223> OTHER INFORMATION: the antigen binding domain

<400> SEQUENCE: 7

Glu Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Thr Gly Tyr
            20                  25                  30

His Met His Trp Val Arg Gln Ala Pro Gly Gln Arg Leu Glu Trp Met
        35                  40                  45

Gly Arg Ile Asn Pro Tyr Asn Gly Ala Ala Ser His Asn Gln Lys Phe
    50                  55                  60

Lys Asp Arg Val Thr Ile Thr Arg Asp Thr Ser Ala Ser Thr Ala Tyr
65                  70                  75                  80

Met Glu Leu Ser Ser Leu Arg Ser Glu Asp Thr Ala Val Tyr Tyr Cys
                85                  90                  95

Ala Arg Gly Trp Asp Tyr Asp Gly Gly Tyr Tyr Ala Met Asp Tyr Trp
            100                 105                 110

Gly Gln Gly Thr Leu Val Thr Val Ser Ser
        115                 120

<210> SEQ ID NO 8
<211> LENGTH: 113
<212> TYPE: PRT
```

<213> ORGANISM: Artificial sequence
<220> FEATURE:
<223> OTHER INFORMATION: the antigen binding domain

<400> SEQUENCE: 8

Asp Ile Gln Met Thr Gln Ser Pro Ser Ser Leu Ser Ala Ser Val Gly
1               5                   10                  15

Asp Arg Val Thr Ile Thr Cys Lys Ser Gln Ser Leu Leu Tyr Ser
            20                  25                  30

Asp Asn Gln Lys Asn Tyr Leu Ala Trp Tyr Gln Gln Lys Pro Gly Lys
        35                  40                  45

Ala Pro Lys Leu Leu Ile Tyr Trp Ala Ser Thr Arg Glu Ser Gly Val
    50                  55                  60

Pro Ser Arg Phe Ser Gly Ser Gly Ser Gly Thr Asp Phe Thr Leu Thr
65                  70                  75                  80

Ile Ser Ser Leu Gln Pro Glu Asp Phe Ala Thr Tyr Tyr Cys Gln Gln
                85                  90                  95

Tyr Tyr Thr Tyr Pro Tyr Thr Phe Gly Gln Gly Thr Lys Leu Glu Ile
            100                 105                 110

Lys

<210> SEQ ID NO 9
<211> LENGTH: 113
<212> TYPE: PRT
<213> ORGANISM: Artificial sequence
<220> FEATURE:
<223> OTHER INFORMATION: the antigen binding domain

<400> SEQUENCE: 9

Asp Ile Val Met Thr Gln Ser Pro Leu Ser Leu Pro Val Thr Pro Gly
1               5                   10                  15

Glu Pro Ala Ser Ile Ser Cys Lys Ser Gln Ser Leu Leu Tyr Ser
            20                  25                  30

Asp Asn Gln Lys Asn Tyr Leu Ala Trp Tyr Leu Gln Lys Pro Gly Gln
        35                  40                  45

Ser Pro Gln Leu Leu Ile Tyr Trp Ala Ser Thr Arg Glu Ser Gly Val
    50                  55                  60

Pro Asp Arg Phe Ser Gly Ser Gly Ser Gly Thr Asp Phe Thr Leu Lys
65                  70                  75                  80

Ile Ser Arg Val Glu Ala Glu Asp Val Gly Val Tyr Tyr Cys Gln Gln
                85                  90                  95

Tyr Tyr Thr Tyr Pro Tyr Thr Phe Gly Gln Gly Thr Lys Leu Glu Ile
            100                 105                 110

Lys

<210> SEQ ID NO 10
<211> LENGTH: 113
<212> TYPE: PRT
<213> ORGANISM: Artificial sequence
<220> FEATURE:
<223> OTHER INFORMATION: the antigen binding domain

<400> SEQUENCE: 10

Asp Ile Val Met Thr Gln Ser Pro Asp Ser Leu Ala Val Ser Leu Gly
1               5                   10                  15

Glu Arg Ala Thr Ile Asn Cys Lys Ser Gln Ser Leu Leu Tyr Ser
            20                  25                  30

Asp Asn Gln Lys Asn Tyr Leu Ala Trp Tyr Gln Gln Lys Pro Gly Gln

```
                35                  40                  45
Pro Pro Lys Leu Leu Ile Tyr Trp Ala Ser Thr Arg Glu Ser Gly Val
 50                  55                  60

Pro Asp Arg Phe Ser Gly Ser Gly Ser Gly Thr Asp Phe Thr Leu Thr
 65                  70                  75                  80

Ile Ser Ser Leu Gln Ala Glu Asp Val Ala Val Tyr Tyr Cys Gln Gln
                 85                  90                  95

Tyr Tyr Thr Tyr Pro Tyr Thr Phe Gly Gln Gly Thr Lys Leu Glu Ile
                100                 105                 110

Lys

<210> SEQ ID NO 11
<211> LENGTH: 123
<212> TYPE: PRT
<213> ORGANISM: Artificial sequence
<220> FEATURE:
<223> OTHER INFORMATION: the antigen binding domain

<400> SEQUENCE: 11

Asp Ile Gln Leu Gln Glu Ser Gly Pro Gly Leu Val Lys Pro Ser Gln
 1               5                  10                  15

Ser Leu Ser Leu Thr Cys Ser Val Thr Gly Tyr Ser Ile Thr Ser Ala
                 20                  25                  30

Tyr Tyr Trp Asn Trp Ile Arg Gln Phe Pro Gly Asn Lys Leu Glu Trp
             35                  40                  45

Met Gly Tyr Ile Ser Tyr Asp Gly Arg Asn Asn Tyr Asn Pro Ser Leu
 50                  55                  60

Lys Asn Arg Ile Ser Ile Thr Arg Asp Thr Ser Lys Asn Gln Phe Phe
 65                  70                  75                  80

Leu Lys Leu Asn Ser Val Thr Thr Glu Asp Thr Ala Thr Tyr Tyr Cys
                 85                  90                  95

Ala Lys Glu Gly Asp Tyr Asp Val Gly Asn Tyr Tyr Ala Met Asp Tyr
                100                 105                 110

Trp Gly Gln Gly Thr Ser Val Thr Val Ser Ser
            115                 120

<210> SEQ ID NO 12
<211> LENGTH: 107
<212> TYPE: PRT
<213> ORGANISM: Artificial sequence
<220> FEATURE:
<223> OTHER INFORMATION: the antigen binding domain

<400> SEQUENCE: 12

Glu Asn Val Leu Thr Gln Ser Pro Ala Ile Met Ser Ala Ser Pro Gly
 1               5                  10                  15

Glu Lys Val Thr Met Thr Cys Arg Ala Ser Ser Asn Val Ile Ser Ser
                 20                  25                  30

Tyr Val His Trp Tyr Gln Gln Arg Ser Gly Ala Ser Pro Lys Leu Trp
             35                  40                  45

Ile Tyr Ser Thr Ser Asn Leu Ala Ser Gly Val Pro Ala Arg Phe Ser
 50                  55                  60

Gly Ser Gly Ser Gly Thr Ser Tyr Ser Leu Thr Ile Ser Val Glu
 65                  70                  75                  80

Ala Glu Asp Ala Ala Thr Tyr Tyr Cys Gln Gln Tyr Ser Gly Tyr Pro
                 85                  90                  95

Leu Thr Phe Gly Ala Gly Thr Lys Leu Glu Leu
```

<210> SEQ ID NO 13
<211> LENGTH: 486
<212> TYPE: PRT
<213> ORGANISM: Artificial sequence
<220> FEATURE:
<223> OTHER INFORMATION: the amino acid sequence of 19C1-CAR

<400> SEQUENCE: 13

Met Ala Leu Pro Val Thr Ala Leu Leu Leu Pro Leu Ala Leu Leu Leu
1               5                   10                  15

His Ala Ala Arg Pro Gln Ile Val Leu Thr Gln Ser Pro Ala Ile Met
            20                  25                  30

Ser Ala Ser Pro Gly Glu Lys Val Thr Met Thr Cys Ser Ala Ser Ser
        35                  40                  45

Ser Val Ser Tyr Met Tyr Trp Tyr Gln Gln Lys Pro Gly Ser Ser Pro
    50                  55                  60

Arg Leu Leu Ile Phe Asp Thr Ser Asn Leu Ala Ser Gly Val Pro Val
65                  70                  75                  80

Arg Phe Ser Gly Ser Gly Ser Gly Thr Ser Tyr Ser Leu Thr Ile Ser
                85                  90                  95

Arg Met Glu Ala Glu Asp Ala Ala Thr Tyr Tyr Cys Gln Gln Trp Ser
            100                 105                 110

Ser Tyr Pro Leu Thr Phe Gly Ala Gly Thr Lys Leu Glu Leu Lys Gly
        115                 120                 125

Gly Gly Gly Ser Gly Gly Gly Ser Gly Gly Gly Ser Gln Val
130                 135                 140

Gln Leu Gln Gln Ser Gly Ala Glu Leu Met Lys Pro Gly Ala Ser Val
145                 150                 155                 160

Lys Ile Ser Cys Lys Ala Thr Gly Tyr Thr Phe Ser Ser Tyr Trp Ile
                165                 170                 175

Glu Trp Val Lys Gln Arg Pro Gly His Gly Leu Glu Trp Ile Gly Glu
            180                 185                 190

Ile Phe Pro Gly Ser Gly Ser Ile Lys Tyr Asn Glu Lys Phe Lys Gly
        195                 200                 205

Lys Ala Thr Phe Thr Ala Asp Thr Ser Ser Asn Thr Ala Tyr Met Gln
    210                 215                 220

Leu Ser Ser Leu Thr Ser Glu Asp Ser Ala Val His Tyr Cys Ala Arg
225                 230                 235                 240

Gly Gly Thr Tyr Asn Asp Tyr Ser Leu Phe Asp Tyr Trp Gly Gln Gly
                245                 250                 255

Thr Thr Leu Thr Val Ser Ser Thr Thr Thr Pro Ala Pro Arg Pro Pro
            260                 265                 270

Thr Pro Ala Pro Thr Ile Ala Ser Gln Pro Leu Ser Leu Arg Pro Glu
        275                 280                 285

Ala Cys Arg Pro Ala Ala Gly Gly Ala Val His Thr Arg Gly Leu Asp
    290                 295                 300

Phe Ala Cys Asp Ile Tyr Ile Trp Ala Pro Leu Ala Gly Thr Cys Gly
305                 310                 315                 320

Val Leu Leu Leu Ser Leu Val Ile Thr Leu Tyr Cys Lys Arg Gly Arg
                325                 330                 335

Lys Lys Leu Leu Tyr Ile Phe Lys Gln Pro Phe Met Arg Pro Val Gln
            340                 345                 350

Thr Thr Gln Glu Glu Asp Gly Cys Ser Cys Arg Phe Pro Glu Glu Glu

```
              355                 360                 365
Glu Gly Gly Cys Glu Leu Arg Val Lys Phe Ser Arg Ser Ala Asp Ala
            370                 375                 380
Pro Ala Tyr Gln Gln Gly Gln Asn Gln Leu Tyr Asn Glu Leu Asn Leu
385                 390                 395                 400
Gly Arg Arg Glu Glu Tyr Asp Val Leu Asp Lys Arg Arg Gly Arg Asp
                405                 410                 415
Pro Glu Met Gly Gly Lys Pro Arg Arg Lys Asn Pro Gln Glu Gly Leu
            420                 425                 430
Tyr Asn Glu Leu Gln Lys Asp Lys Met Ala Glu Ala Tyr Ser Glu Ile
                435                 440                 445
Gly Met Lys Gly Glu Arg Arg Arg Gly Lys Gly His Asp Gly Leu Tyr
            450                 455                 460
Gln Gly Leu Ser Thr Ala Thr Lys Asp Thr Tyr Asp Ala Leu His Met
465                 470                 475                 480
Gln Ala Leu Pro Pro Arg
                485
```

<210> SEQ ID NO 14
<211> LENGTH: 482
<212> TYPE: PRT
<213> ORGANISM: Artificial sequence
<220> FEATURE:
<223> OTHER INFORMATION: the amino acid sequence of 23D7-CAR

<400> SEQUENCE: 14

```
Met Ala Leu Pro Val Thr Ala Leu Leu Leu Pro Leu Ala Leu Leu Leu
1               5                   10                  15
His Ala Ala Arg Pro Gln Ile Val Leu Thr Gln Ser Pro Ala Ile Met
                20                  25                  30
Ser Ala Ser Pro Gly Glu Lys Val Thr Met Thr Cys Ser Ala Ser Ser
            35                  40                  45
Ser Val Ser Tyr Ile Tyr Trp Tyr Gln Gln Lys Pro Gly Ser Ser Pro
        50                  55                  60
Gly Leu Leu Ile Tyr Asp Thr Ser Asn Leu Ala Ser Gly Val Pro Val
65                  70                  75                  80
Arg Phe Ser Gly Ser Gly Ser Gly Thr Ser Tyr Ser Leu Thr Ile Ser
                85                  90                  95
Arg Met Glu Ala Glu Asp Ala Ala Thr Tyr Tyr Cys Gln Gln Trp Ser
                100                 105                 110
Ser Phe Pro Pro Thr Phe Gly Ala Gly Thr Lys Leu Glu Leu Lys Gly
            115                 120                 125
Gly Gly Gly Ser Gly Gly Gly Ser Gly Gly Gly Ser Gln Val
        130                 135                 140
Gln Leu Gln Gln Pro Gly Ser Asp Leu Val Arg Pro Gly Ala Ser Val
145                 150                 155                 160
Lys Leu Ser Cys Lys Ala Ser Gly Tyr Thr Phe Thr Arg Tyr Trp Met
                165                 170                 175
His Trp Val Lys Gln Arg Pro Gly His Gly Leu Glu Trp Ile Gly Tyr
                180                 185                 190
Ile Tyr Pro Gly Ser Gly Thr Ser Asn Tyr Asp Glu Lys Phe Lys Ser
            195                 200                 205
Lys Ala Thr Leu Thr Val Asp Thr Ser Ser Thr Ala Tyr Met Gln
            210                 215                 220
Leu Ser Ser Leu Thr Ser Glu Asp Ser Ala Val Tyr Tyr Cys Thr Arg
```

```
            225                 230                 235                 240
Glu Ala Arg Tyr Thr Met Asp Tyr Trp Gly Gln Gly Thr Ser Val Thr
                245                 250                 255

Val Ser Ser Thr Thr Thr Pro Ala Pro Arg Pro Pro Thr Pro Ala Pro
                260                 265                 270

Thr Ile Ala Ser Gln Pro Leu Ser Leu Arg Pro Glu Ala Cys Arg Pro
                275                 280                 285

Ala Ala Gly Gly Ala Val His Thr Arg Gly Leu Asp Phe Ala Cys Asp
                290                 295                 300

Ile Tyr Ile Trp Ala Pro Leu Ala Gly Thr Cys Gly Val Leu Leu Leu
305                 310                 315                 320

Ser Leu Val Ile Thr Leu Tyr Cys Lys Arg Gly Arg Lys Lys Leu Leu
                325                 330                 335

Tyr Ile Phe Lys Gln Pro Phe Met Arg Pro Val Gln Thr Thr Gln Glu
                340                 345                 350

Glu Asp Gly Cys Ser Cys Arg Phe Pro Glu Glu Glu Glu Gly Gly Cys
                355                 360                 365

Glu Leu Arg Val Lys Phe Ser Arg Ser Ala Asp Ala Pro Ala Tyr Gln
                370                 375                 380

Gln Gly Gln Asn Gln Leu Tyr Asn Glu Leu Asn Leu Gly Arg Arg Glu
385                 390                 395                 400

Glu Tyr Asp Val Leu Asp Lys Arg Arg Gly Arg Asp Pro Glu Met Gly
                405                 410                 415

Gly Lys Pro Arg Arg Lys Asn Pro Gln Glu Gly Leu Tyr Asn Glu Leu
                420                 425                 430

Gln Lys Asp Lys Met Ala Glu Ala Tyr Ser Glu Ile Gly Met Lys Gly
                435                 440                 445

Glu Arg Arg Arg Gly Lys Gly His Asp Gly Leu Tyr Gln Gly Leu Ser
                450                 455                 460

Thr Ala Thr Lys Asp Thr Tyr Asp Ala Leu His Met Gln Ala Leu Pro
465                 470                 475                 480

Pro Arg

<210> SEQ ID NO 15
<211> LENGTH: 494
<212> TYPE: PRT
<213> ORGANISM: Artificial sequence
<220> FEATURE:
<223> OTHER INFORMATION: the amino acid sequence of 27H4-CAR

<400> SEQUENCE: 15

Met Ala Leu Pro Val Thr Ala Leu Leu Leu Pro Leu Ala Leu Leu Leu
1               5                   10                  15

His Ala Ala Arg Pro Asp Ile Val Met Ser Gln Ser Pro Ser Ser Leu
                20                  25                  30

Ala Val Ser Val Gly Glu Lys Val Thr Met Ser Cys Lys Ser Ser Gln
                35                  40                  45

Ser Leu Leu Tyr Ser Asp Asn Gln Lys Asn Tyr Leu Ala Trp Tyr Gln
                50                  55                  60

Gln Lys Pro Gly Gln Ser Pro Lys Leu Leu Ile Tyr Trp Ala Ser Thr
65                  70                  75                  80

Arg Glu Ser Gly Val Pro Asp Arg Phe Thr Gly Ser Gly Ser Gly Thr
                85                  90                  95

Asp Phe Thr Leu Thr Ile Ser Ser Val Lys Ala Glu Asp Leu Ala Val
                100                 105                 110
```

Tyr Tyr Cys Gln Gln Tyr Tyr Thr Tyr Pro Tyr Thr Phe Gly Gly Gly
            115                 120                 125

Thr Lys Leu Glu Ile Lys Gly Gly Gly Ser Gly Gly Gly Gly Ser
        130                 135                 140

Gly Gly Gly Gly Ser Glu Val Gln Leu Gln Gln Ser Gly Pro Glu Leu
145                 150                 155                 160

Val Lys Pro Gly Ala Ser Val Lys Ile Ser Cys Lys Ala Ser Gly Tyr
                165                 170                 175

Ser Phe Thr Gly Tyr His Met His Trp Val Lys Gln Ser His Val Lys
            180                 185                 190

Ser Leu Glu Trp Ile Gly Arg Ile Asn Pro Tyr Asn Gly Ala Ala Ser
        195                 200                 205

His Asn Gln Lys Phe Lys Asp Lys Ala Thr Leu Thr Val Asp Lys Ser
    210                 215                 220

Ser Ser Thr Ala Tyr Met Glu Leu His Ser Leu Thr Ser Glu Asp Ser
225                 230                 235                 240

Ala Val Tyr Tyr Cys Ala Arg Gly Trp Asp Tyr Asp Gly Gly Tyr Tyr
                245                 250                 255

Ala Met Asp Tyr Trp Gly Gln Gly Thr Ser Val Thr Val Ser Ser Thr
            260                 265                 270

Thr Thr Pro Ala Pro Arg Pro Pro Thr Pro Ala Pro Thr Ile Ala Ser
        275                 280                 285

Gln Pro Leu Ser Leu Arg Pro Glu Ala Cys Arg Pro Ala Ala Gly Gly
    290                 295                 300

Ala Val His Thr Arg Gly Leu Asp Phe Ala Cys Asp Ile Tyr Ile Trp
305                 310                 315                 320

Ala Pro Leu Ala Gly Thr Cys Gly Val Leu Leu Leu Ser Leu Val Ile
                325                 330                 335

Thr Leu Tyr Cys Lys Arg Gly Arg Lys Lys Leu Leu Tyr Ile Phe Lys
            340                 345                 350

Gln Pro Phe Met Arg Pro Val Gln Thr Thr Gln Glu Glu Asp Gly Cys
        355                 360                 365

Ser Cys Arg Phe Pro Glu Glu Glu Glu Gly Gly Cys Glu Leu Arg Val
    370                 375                 380

Lys Phe Ser Arg Ser Ala Asp Ala Pro Ala Tyr Gln Gln Gly Gln Asn
385                 390                 395                 400

Gln Leu Tyr Asn Glu Leu Asn Leu Gly Arg Arg Glu Glu Tyr Asp Val
                405                 410                 415

Leu Asp Lys Arg Arg Gly Arg Asp Pro Glu Met Gly Gly Lys Pro Arg
            420                 425                 430

Arg Lys Asn Pro Gln Glu Gly Leu Tyr Asn Glu Leu Gln Lys Asp Lys
        435                 440                 445

Met Ala Glu Ala Tyr Ser Glu Ile Gly Met Lys Gly Glu Arg Arg Arg
    450                 455                 460

Gly Lys Gly His Asp Gly Leu Tyr Gln Gly Leu Ser Thr Ala Thr Lys
465                 470                 475                 480

Asp Thr Tyr Asp Ala Leu His Met Gln Ala Leu Pro Pro Arg
                485                 490

<210> SEQ ID NO 16
<211> LENGTH: 495
<212> TYPE: PRT
<213> ORGANISM: Artificial sequence
<220> FEATURE:

<223> OTHER INFORMATION: the amino acid sequence of H27H4-CAR

<400> SEQUENCE: 16

Met Asp Met Arg Val Pro Ala Gln Leu Leu Gly Leu Leu Leu Leu Trp
1               5                   10                  15

Leu Arg Gly Ala Arg Cys Asp Ile Gln Met Thr Gln Ser Pro Ser Ser
            20                  25                  30

Leu Ser Ala Ser Val Gly Asp Arg Val Thr Ile Thr Cys Lys Ser Ser
        35                  40                  45

Gln Ser Leu Leu Tyr Ser Asp Asn Gln Lys Asn Tyr Leu Ala Trp Tyr
    50                  55                  60

Gln Gln Lys Pro Gly Lys Ala Pro Lys Leu Leu Ile Tyr Trp Ala Ser
65                  70                  75                  80

Thr Arg Glu Ser Gly Val Pro Ser Arg Phe Ser Gly Ser Gly Ser Gly
                85                  90                  95

Thr Asp Phe Thr Leu Thr Ile Ser Ser Leu Gln Pro Glu Asp Phe Ala
            100                 105                 110

Thr Tyr Tyr Cys Gln Gln Tyr Tyr Thr Tyr Pro Tyr Thr Phe Gly Gln
        115                 120                 125

Gly Thr Lys Leu Glu Ile Lys Gly Gly Gly Gly Ser Gly Gly Gly Gly
    130                 135                 140

Ser Gly Gly Gly Gly Ser Glu Val Gln Leu Val Gln Ser Gly Ala Glu
145                 150                 155                 160

Val Lys Lys Pro Gly Ala Ser Val Lys Val Ser Cys Lys Ala Ser Gly
                165                 170                 175

Tyr Thr Phe Thr Gly Tyr His Met His Trp Val Arg Gln Ala Pro Gly
            180                 185                 190

Gln Arg Leu Glu Trp Met Gly Arg Ile Asn Pro Tyr Asn Gly Ala Ala
        195                 200                 205

Ser His Asn Gln Lys Phe Lys Asp Arg Val Thr Ile Thr Arg Asp Thr
    210                 215                 220

Ser Ala Ser Thr Ala Tyr Met Glu Leu Ser Ser Leu Arg Ser Glu Asp
225                 230                 235                 240

Thr Ala Val Tyr Tyr Cys Ala Arg Gly Trp Asp Tyr Asp Gly Gly Tyr
                245                 250                 255

Tyr Ala Met Asp Tyr Trp Gly Gln Gly Thr Leu Val Thr Val Ser Ser
            260                 265                 270

Thr Thr Thr Pro Ala Pro Arg Pro Pro Thr Pro Ala Pro Thr Ile Ala
        275                 280                 285

Ser Gln Pro Leu Ser Leu Arg Pro Glu Ala Cys Arg Pro Ala Ala Gly
    290                 295                 300

Gly Ala Val His Thr Arg Gly Leu Asp Phe Ala Cys Asp Ile Tyr Ile
305                 310                 315                 320

Trp Ala Pro Leu Ala Gly Thr Cys Gly Val Leu Leu Leu Ser Leu Val
                325                 330                 335

Ile Thr Leu Tyr Cys Lys Arg Gly Arg Lys Lys Leu Leu Tyr Ile Phe
            340                 345                 350

Lys Gln Pro Phe Met Arg Pro Val Gln Thr Thr Gln Glu Glu Asp Gly
        355                 360                 365

Cys Ser Cys Arg Phe Pro Glu Glu Glu Glu Gly Gly Cys Glu Leu Arg
    370                 375                 380

Val Lys Phe Ser Arg Ser Ala Asp Ala Pro Ala Tyr Gln Gln Gly Gln
385                 390                 395                 400

Asn Gln Leu Tyr Asn Glu Leu Asn Leu Gly Arg Arg Glu Glu Tyr Asp
            405                 410                 415

Val Leu Asp Lys Arg Arg Gly Arg Asp Pro Glu Met Gly Gly Lys Pro
        420                 425                 430

Arg Arg Lys Asn Pro Gln Glu Gly Leu Tyr Asn Glu Leu Gln Lys Asp
            435                 440                 445

Lys Met Ala Glu Ala Tyr Ser Glu Ile Gly Met Lys Gly Glu Arg Arg
    450                 455                 460

Arg Gly Lys Gly His Asp Gly Leu Tyr Gln Gly Leu Ser Thr Ala Thr
465                 470                 475                 480

Lys Asp Thr Tyr Asp Ala Leu His Met Gln Ala Leu Pro Pro Arg
                485                 490                 495

<210> SEQ ID NO 17
<211> LENGTH: 489
<212> TYPE: PRT
<213> ORGANISM: Artificial sequence
<220> FEATURE:
<223> OTHER INFORMATION: the amino acid sequence of 1075.7-CAR

<400> SEQUENCE: 17

Met Ala Leu Pro Val Thr Ala Leu Leu Leu Pro Leu Ala Leu Leu Leu
1               5                   10                  15

His Ala Ala Arg Pro Glu Asn Val Leu Thr Gln Ser Pro Ala Ile Met
            20                  25                  30

Ser Ala Ser Pro Gly Glu Lys Val Thr Met Thr Cys Arg Ala Ser Ser
        35                  40                  45

Asn Val Ile Ser Ser Tyr Val His Trp Tyr Gln Gln Arg Ser Gly Ala
    50                  55                  60

Ser Pro Lys Leu Trp Ile Tyr Ser Thr Ser Asn Leu Ala Ser Gly Val
65                  70                  75                  80

Pro Ala Arg Phe Ser Gly Ser Gly Ser Gly Thr Ser Tyr Ser Leu Thr
                85                  90                  95

Ile Ser Ser Val Glu Ala Glu Asp Ala Ala Thr Tyr Tyr Cys Gln Gln
            100                 105                 110

Tyr Ser Gly Tyr Pro Leu Thr Phe Gly Ala Gly Thr Lys Leu Glu Leu
        115                 120                 125

Gly Gly Gly Gly Ser Gly Gly Gly Ser Gly Gly Gly Gly Ser Asp
    130                 135                 140

Ile Gln Leu Gln Glu Ser Gly Pro Gly Leu Val Lys Pro Ser Gln Ser
145                 150                 155                 160

Leu Ser Leu Thr Cys Ser Val Thr Gly Tyr Ser Ile Thr Ser Ala Tyr
                165                 170                 175

Tyr Trp Asn Trp Ile Arg Gln Phe Pro Gly Asn Lys Leu Glu Trp Met
            180                 185                 190

Gly Tyr Ile Ser Tyr Asp Gly Arg Asn Asn Tyr Asn Pro Ser Leu Lys
        195                 200                 205

Asn Arg Ile Ser Ile Thr Arg Asp Thr Ser Lys Asn Gln Phe Phe Leu
    210                 215                 220

Lys Leu Asn Ser Val Thr Thr Glu Asp Thr Ala Thr Tyr Tyr Cys Ala
225                 230                 235                 240

Lys Glu Gly Asp Tyr Asp Val Gly Asn Tyr Tyr Ala Met Asp Tyr Trp
                245                 250                 255

Gly Gln Gly Thr Ser Val Thr Val Ser Ser Thr Thr Thr Pro Ala Pro
            260                 265                 270

```
Arg Pro Pro Thr Pro Ala Pro Thr Ile Ala Ser Gln Pro Leu Ser Leu
            275                 280                 285
Arg Pro Glu Ala Cys Arg Pro Ala Ala Gly Gly Ala Val His Thr Arg
        290                 295                 300
Gly Leu Asp Phe Ala Cys Asp Ile Tyr Ile Trp Ala Pro Leu Ala Gly
305                 310                 315                 320
Thr Cys Gly Val Leu Leu Leu Ser Leu Val Ile Thr Leu Tyr Cys Lys
                325                 330                 335
Arg Gly Arg Lys Lys Leu Leu Tyr Ile Phe Lys Gln Pro Phe Met Arg
            340                 345                 350
Pro Val Gln Thr Thr Gln Glu Glu Asp Gly Cys Ser Cys Arg Phe Pro
        355                 360                 365
Glu Glu Glu Glu Gly Gly Cys Glu Leu Arg Val Lys Phe Ser Arg Ser
370                 375                 380
Ala Asp Ala Pro Ala Tyr Gln Gln Gly Gln Asn Gln Leu Tyr Asn Glu
385                 390                 395                 400
Leu Asn Leu Gly Arg Arg Glu Glu Tyr Asp Val Leu Asp Lys Arg Arg
                405                 410                 415
Gly Arg Asp Pro Glu Met Gly Gly Lys Pro Arg Arg Lys Asn Pro Gln
            420                 425                 430
Glu Gly Leu Tyr Asn Glu Leu Gln Lys Asp Lys Met Ala Glu Ala Tyr
        435                 440                 445
Ser Glu Ile Gly Met Lys Gly Glu Arg Arg Arg Gly Lys Gly His Asp
    450                 455                 460
Gly Leu Tyr Gln Gly Leu Ser Thr Ala Thr Lys Asp Thr Tyr Asp Ala
465                 470                 475                 480
Leu His Met Gln Ala Leu Pro Pro Arg
                485
```

<210> SEQ ID NO 18
<211> LENGTH: 1461
<212> TYPE: DNA
<213> ORGANISM: Artificial sequence
<220> FEATURE:
<223> OTHER INFORMATION: the coding gene of 19C1-CAR

<400> SEQUENCE: 18

```
atggccctcc cagtcacagc tctgctgctc ccactcgccc tgctgctgca cgccgcacgg      60
cctcagatcg tcctcaccca gtctccagcc atcatgagcg cctctccagg cgagaaggtg     120
acaatgactt gttccgcaag cagctcagtt agttacatgt attggtacca gcagaaacca     180
ggctcttctc caaggctcct gatcttcgac acttctaacc tggcatccgg agtcccagtg     240
cggttcagcg gcagcggcag tggaacatct tatagcctga ctattagccg gatggaggca     300
gaagatgcag ctacctacta ctgtcaacag tggtctagtt atccactcac ttttggtgca     360
gggaccaagc tggagctcaa aggtggagga ggatctggcg gcggaggag tggaggaggc      420
ggctcacagg tccaactgca gcaatctggt gcagaactga tgaagcctgg agcaagcgtt     480
aaaatctctt gcaaagcaac aggatacacc ttttcttcct actggataga gtgggtgaaa     540
caaagaccag acacggact ggaatggata ggagagatct tcctggcag cggctcaatc      600
aagtataacg agaagttcaa agggaaagcc accttcacag ccgatacctc ttctaataca     660
gcctatatgc agctgtcatc cctgaccagc gaagattctg ctgttcacta ctgtgcacgc     720
ggaggaacat acaatgacta ctctctgttt gactattggg gacagggcac cactctgact     780
gtgagttcta ctacgacccc tgcaccgcgg ccgcctactc ctgcacctac aatcgcaagt     840
```

```
cagccactga gtctcagacc cgaagcatgc cgccctgctg caggcggagc tgtccataca      900
cgcggactgg actttgcatg cgatatatac atctgggcac cactggccgg cacttgcggc      960
gtgctgctcc tgtccctcgt gattaccctg tactgcaaac gcggcaggaa gaagctcctg     1020
tatatcttta aacagcccct tcatgaggca gtgcagacca ctcaagagga agacggttgt     1080
agctgccggt ttcccgagga agaagaggga ggctgcgagc tccgcgtgaa gttctcccgc     1140
tcagccgatg caccegccta tcagcaaggg cagaaccagc tgtacaatga gctcaacctg     1200
ggaagaaggg aggaatatga cgttctggat aaacggcgcg gtcgcgatcc gaaatgggt      1260 gggaagcctc gcaggaagaa tcctcaggaa gggctctaca atgagctgca gaaagacaaa     1320
atggcagagg cctattctga atcggcatg aagggcgagc gccgcagagg caaaggacac      1380
gacggcctgt accagggcct gtctacagcc accaaggaca cctatgacgc tctccacatg     1440
caagccctgc caccaaggtg a                                               1461

<210> SEQ ID NO 19
<211> LENGTH: 1449
<212> TYPE: DNA
<213> ORGANISM: Artificial sequence
<220> FEATURE:
<223> OTHER INFORMATION: the coding gene of 23D7-CAR

<400> SEQUENCE: 19
atggctctcc ctgttactgc actcctgctc ccactggcac tgctgctgca tgccgctcgg       60
ccacaaatag ttctgactca gagtcctgcc attatgtcag cctctcctgg agagaaggtc      120
acaatgactt gctctgcctc tagtagtgtg tcttacatat actggtacca gcagaagcct      180
ggttcttctc ccggactgct gatctatgac catccaatc tggcttcagg cgttcccgtc       240
agattcagcg gtctggatc tggcacaagc tattctctga ccatctcaag aatggaggct       300
gaagatgctg ctacttatta ttgccaacag tggtcttcct ttccaccaac cttcggtgca      360
ggtaccaagc tcgaactcaa aggtggagga ggaagcggag gaggcggtag tggtggaggt      420
gggtcccaag ttcagctgca acagcccgga tctgatctgg ttcggccggg agctagcgtg      480
aaactgtctt gcaaggctag cggatacact ttcacccgct attggatgca ctgggttaag      540
cagcggccag gacacggact ggagtggatt ggctatatct acccaggcag cgggacaagt      600
aactacgatg agaaattcaa gagtaaggct actctgactg tcgatacaag ttcctcaacc      660
gcttacatgc agctctcttc actcaccagc gaagacagtg ctgtttatta ctgcaccagg      720
gaagctcggt acaccatgga ttattggggt caaggaactt ctgtgacagt gtcaagcact      780
acgacccctg caccgcggcc gcctactcct gcacctacaa tcgcaagtca gccactgagt      840
ctcagacccg aagcatgccg ccctgctgca ggcggagctg tccatacacg cggactggac      900
tttgcatgcg atatatacat ctgggcacca ctggccggca cttgcggcgt gctgctcctg      960
tccctcgtga ttaccctgta ctgcaaacgg gcaggaagaa agctcctgta tatctttaaa     1020
cagcccttca tgaggccagt gcagaccact caagaggaag acggttgtag ctgccggttt     1080
cccgaggaag aagagggagg ctgcgagctc cgcgtgaagt tctcccgctc agccgatgca     1140
cccgcctatc agcaagggca gaaccagctg tacaatgagc tcaacctggg aagaagggag     1200
gaatatgacg ttctggataa cggcgcggt cgcgatcccg aaatgggtgg aagcctcgc       1260 aggaagaatc ctcaggaagg gctctacaat gagctgcaga agacaaaat ggcagaggcc      1320 tattctgaaa tcggcatgaa gggcgagcgc cgcagaggca aaggacacga cggcctgtac     1380
```

| | |
|---|---|
| cagggcctgt ctacagccac caaggacacc tatgacgctc tccacatgca agccctgcca | 1440 |
| ccaaggtga | 1449 |

<210> SEQ ID NO 20
<211> LENGTH: 1485
<212> TYPE: DNA
<213> ORGANISM: Artificial sequence
<220> FEATURE:
<223> OTHER INFORMATION: the coding gene of 27H4-CAR

<400> SEQUENCE: 20

| | |
|---|---|
| atggctctgc ctgttactgc actgctgctc cctctggctc tcctcctgca tgctgctcgg | 60 |
| cctgatatag tgatgtccca agcccatcc agcctggccg tgtccgtcgg cgaaaaggtg | 120 |
| actatgagtt gcaaatccag ccaaagcctg ctgtacagtg acaaccaaaa gaactacctg | 180 |
| gcatggtacc agcagaagcc tggacagtca ccaaagctcc tcatctactg ggctagcaca | 240 |
| agggagagcg gcgtcccaga caggtttact ggcagcggga gtggcaccga tttcaccctg | 300 |
| acaataagct ctgtcaaggc cgaagacctc gctgtgtact attgtcagca gtattatacc | 360 |
| tatccctata ctttcggtgg agggaccaaa ctcgagatta aggaggtgg cggctctgga | 420 |
| ggtggaggtt ccggcggtgg cggtagtgaa gtgcagctgc agcagagcgg gcctgaactc | 480 |
| gtgaaacctg gtgcctccgt taaaatctcc tgcaaggcca gcggctactc attcacaggg | 540 |
| tatcacatgc attgggtgaa gcagagccac gtcaaatcac tggaatggat cggcaggatt | 600 |
| aatccataca atggcgctgc ttcacataac agaagttca aggacaaagc caccctgact | 660 |
| gtcgataagt catcaagtac agcatacatg gagctgcatt ccctgactag cgaggacagc | 720 |
| gctgtttact actgcgcacg cggctgggac tacgacggtg ctattacgc catggactac | 780 |
| tggggacaag gcaccagcgt cacagtttca agtactacga cccctgcacc gcggccgcct | 840 |
| actcctgcac ctacaatcgc aagtcagcca ctgagtctca acccgaagc atgccgccct | 900 |
| gctgcaggcg gagctgtcca tacacgcgga ctggactttg catgcgatat atacatctgg | 960 |
| gcaccactgg ccggcacttg cggcgtgctg ctcctgtccc tcgtgattac cctgtactgc | 1020 |
| aaacgcggca ggaagaagct cctgtatatc tttaaacagc ccttcatgag gccagtgcag | 1080 |
| accactcaag aggaagacgg ttgtagctgc cggtttcccg aggaagaaga gggaggctgc | 1140 |
| gagctccgcg tgaagttctc ccgctcagcc gatgcacccg cctatcagca agggcagaac | 1200 |
| cagctgtaca atgagctcaa cctgggaaga agggaggaat atgacgttct ggataaacgg | 1260 |
| cgcggtcgcg atcccgaaat gggtgggaag cctcgcagga agaatcctca ggaagggctc | 1320 |
| tacaatgagc tgcagaaaga caaaatggca gaggcctatt ctgaaatcgg catgaagggc | 1380 |
| gagcgccgca gaggcaaagg acacgacggc ctgtaccagg gcctgtctac agccaccaag | 1440 |
| gacacctatg acgctctcca catgcaagcc ctgccaccaa ggtga | 1485 |

<210> SEQ ID NO 21
<211> LENGTH: 1488
<212> TYPE: DNA
<213> ORGANISM: Artificial sequence
<220> FEATURE:
<223> OTHER INFORMATION: the coding gene of H27H4-CAR

<400> SEQUENCE: 21

| | |
|---|---|
| atggatatga gggttcctgc acaactcctg ggactcctcc tgctctggct gagaggcgca | 60 |
| agatgtgata tccagatgac ccagtctcct agtagcctgt ctgcctccgt cggcgatcgg | 120 |
| gtgaccatta cttgcaaatc ctcacagagc ctcctctact ccgataatca gaagaactac | 180 |

```
ctcgcctggt atcaacagaa accagggaag gcacctaagc tgctgatcta ctgggctagt     240
acccgcgaat ccggcgtccc tagcaggttc tctggcagcg ggagcgggac agatttcacc     300
ctcactatct cctccctgca gcctgaagac ttcgcaactt actactgtca gcagtattat     360
acttacccat acactttcgg cagggaaca aaactggaaa ttaaaggtgg aggtggatct     420
ggtggcggtg gcagtggcgg aggcgggtct gaagtccaac tggtgcagag cggtgcagag     480
gtgaagaagc tggagcatc agtgaaggtg tcttgcaaag ccagtggcta cacattcact     540
ggatatcata tgcattgggt taggcaggca cccggccagc ggctggagtg gatgggaaga     600
atcaaccctt ataatggcgc tgcctctcac aatcaaaagt ttaaggatcg ggtcactatc     660
actcgggaca cttccgcaag caccgcctat atggagctga gcagcctgcg gagtgaagac     720
acagcagtct actactgtgc tcgcggatgg gactatgacg gcggttatta tgccatggat     780
tactggggac agggcacact ggtcaccgtg agcagcacta cgacccctgc accgcggccg     840
cctactcctg cacctacaat cgcaagtcag ccactgagtc tcagaccga agcatgccgc     900 cctgctgcag gcggagctgt ccatacacgc ggactggact ttgcatgcga tatatacatc     960
tgggcaccac tggccggcac ttgcggcgtg ctgctcctgt ccctcgtgat taccctgtac    1020
tgcaaacgcg gcaggaagaa gctcctgtat atctttaaac agcccttcat gaggccagtg    1080
cagaccactc aagaggaaga cggttgtagc tgccggtttc ccgaggaaga agagggaggc    1140
tgcgagctcc gcgtgaagtt ctcccgctca gccgatgcac ccgcctatca gcaagggcag    1200
aaccagctgt acaatgagct caacctggga agaagggagg aatatgacgt tctggataaa    1260
cggcgcggtc gcgatcccga atgggtggg aagcctcgca ggaagaatcc tcaggaaggg    1320
ctctacaatg agctgcagaa agacaaaatg gcagaggcct attctgaaat cggcatgaag    1380
ggcgagcgcc gcagaggcaa aggacacgac ggcctgtacc agggcctgtc tacagccacc    1440
aaggacacct atgacgctct ccacatgcaa gccctgccac caaggtga                1488
```

<210> SEQ ID NO 22
<211> LENGTH: 1470
<212> TYPE: DNA
<213> ORGANISM: Artificial sequence
<220> FEATURE:
<223> OTHER INFORMATION: the coding gene of 1075.7-CAR

<400> SEQUENCE: 22

```
atggctctgc ctgttactgc actcctcctc ccactggcac tcctcctgca tgcagccagg      60
cccgagaatg tgctgacaca gtctccagcc atcatgagcg cctctcccgg tgaaaaggtt     120
actatgacct gtcgggcaag ttcaaatgtg atctcctctt atgtgcactg gtaccagcag     180
cgctcaggtg caagcccaaa gctgtggatc tattccactt caacctggc ctccggtgtc     240 ccagcccgct tttctggaag cgggtcaggc acctcatact ccctcaccat atcaagtgtg     300
gaagctgaga tgcagctac ttactactgc caacagtact ctggttaccc actgaccttc     360
ggagccggga caaagctgga actgggagga ggcgggtccg gcggtggagg gtccggaggt     420
ggcgggtccg atatccagct gcaagagtca ggcccaggcc tggtcaaacc ttcccaaagc     480
ctgagtctca cctgttccgt gacaggttat tccattacta gcgcatatta ctggaactgg     540
ataagacaat tcccaggaaa caaactcgag tggatgggct acatctcata cgacgggcgg    600
aacaactata acccatccct gaagaatcgg atttccatca ctagagacac atccaagaac     660
cagttctttt tcaagctgaa tagcgtgaca actgaggata cagcaaccta ctattgcgcc     720
```

-continued

```
aaggaaggag actatgatgt tggcaactat tatgcaatgg actattgggg acagggcaca    780
tcagtgaccg tgagcagcac tacgacccct gcaccgcggc cgcctactcc tgcacctaca    840
atcgcaagtc agccactgag tctcagaccc gaagcatgcc gccctgctgc aggcggagct    900
gtccatacac gcggactgga cttttgcatgc gatatataca tctgggcacc actggccggc    960
acttgcggcg tgctgctcct gtccctcgtg attaccctgt actgcaaacg cggcaggaag   1020
aagctcctgt atatctttaa acagcccttc atgaggccag tgcagaccac tcaagaggaa   1080
gacggttgta gctgccggtt tcccgaggaa gaagagggag gctgcgagct ccgcgtgaag   1140
ttctcccgct cagccgatgc acccgcctat cagcaagggc agaaccagct gtacaatgag   1200
ctcaacctgg gaagaaggga ggaatatgac gttctggata acggcgcgg tcgcgatccc    1260 gaaatgggtg ggaagcctcg caggaagaat cctcaggaag ggctctacaa tgagctgcag   1320
aaagacaaaa tggcagaggc ctattctgaa atcggcatga agggcgagcg ccgcagaggc   1380
aaaggacacg acggcctgta ccagggcctg tctacagcca ccaaggacac ctatgacgct   1440
ctccacatgc aagccctgcc accaaggtga                                    1470
```

<210> SEQ ID NO 23
<211> LENGTH: 21
<212> TYPE: PRT
<213> ORGANISM: Artificial sequence
<220> FEATURE:
<223> OTHER INFORMATION: the amino acid sequence of CD8alpha signal peptide

<400> SEQUENCE: 23

Met Ala Leu Pro Val Thr Ala Leu Leu Leu Pro Leu Ala Leu Leu Leu
1               5                   10                  15

His Ala Ala Arg Pro
            20

<210> SEQ ID NO 24
<211> LENGTH: 63
<212> TYPE: DNA
<213> ORGANISM: Artificial sequence
<220> FEATURE:
<223> OTHER INFORMATION: the nucleic acid sequence of CD8alpha signal peptide

<400> SEQUENCE: 24

```
atggcactgc cagtgacagc cctgctgctg ccactggccc tgctgctgca cgcagcacgc    60
cct                                                                  63
```

<210> SEQ ID NO 25
<211> LENGTH: 22
<212> TYPE: PRT
<213> ORGANISM: Artificial sequence
<220> FEATURE:
<223> OTHER INFORMATION: the amino acid sequence of IgGkappa light chain signal peptide

<400> SEQUENCE: 25

Met Asp Met Arg Val Pro Ala Gln Leu Leu Gly Leu Leu Leu Leu Trp
1               5                   10                  15

Leu Arg Gly Ala Arg Cys
            20

<210> SEQ ID NO 26
<211> LENGTH: 66
<212> TYPE: DNA

<213> ORGANISM: Artificial sequence
<220> FEATURE:
<223> OTHER INFORMATION: the nucleic acid sequence of IgGkappa light
      chain signal peptide

<400> SEQUENCE: 26
atggatatga gggttcctgc acaactcctg ggactcctcc tgctctggct gagaggcgca    60
agatgt    66

<210> SEQ ID NO 27
<211> LENGTH: 45
<212> TYPE: PRT
<213> ORGANISM: Artificial sequence
<220> FEATURE:
<223> OTHER INFORMATION: the amino acid sequence of CD8alpha Hinge

<400> SEQUENCE: 27

Thr Thr Thr Pro Ala Pro Arg Pro Pro Thr Pro Ala Pro Thr Ile Ala
1               5                   10                  15

Ser Gln Pro Leu Ser Leu Arg Pro Glu Ala Cys Arg Pro Ala Ala Gly
            20                  25                  30

Gly Ala Val His Thr Arg Gly Leu Asp Phe Ala Cys Asp
        35                  40                  45

<210> SEQ ID NO 28
<211> LENGTH: 135
<212> TYPE: DNA
<213> ORGANISM: Artificial sequence
<220> FEATURE:
<223> OTHER INFORMATION: the nucleic acid sequence of CD8alpha Hinge

<400> SEQUENCE: 28
accacgacgc cagcgccgcg accaccaaca ccggcgccca ccatcgcgtc gcagcccctg    60
tccctgcgcc cagaggcgtg ccggccagcg gcggggggcg cagtgcacac gagggggctg   120
gacttcgcct gtgat    135

<210> SEQ ID NO 29
<211> LENGTH: 24
<212> TYPE: PRT
<213> ORGANISM: Artificial sequence
<220> FEATURE:
<223> OTHER INFORMATION: the amino acid sequence of CD8alpha TM

<400> SEQUENCE: 29

Ile Tyr Ile Trp Ala Pro Leu Ala Gly Thr Cys Gly Val Leu Leu Leu
1               5                   10                  15

Ser Leu Val Ile Thr Leu Tyr Cys
            20

<210> SEQ ID NO 30
<211> LENGTH: 72
<212> TYPE: DNA
<213> ORGANISM: Artificial sequence
<220> FEATURE:
<223> OTHER INFORMATION: the nucleic acid sequence of CD8alpha TM

<400> SEQUENCE: 30
atctacatct gggcgcccct tgccgggact tgtgggggtcc ttctcctgtc actggttatc    60 acccttttact gc    72

<210> SEQ ID NO 31
<211> LENGTH: 42

<212> TYPE: PRT
<213> ORGANISM: Artificial sequence
<220> FEATURE:
<223> OTHER INFORMATION: the amino acid sequence of 4-1BB

<400> SEQUENCE: 31

Lys Arg Gly Arg Lys Lys Leu Leu Tyr Ile Phe Lys Gln Pro Phe Met
1               5                   10                  15

Arg Pro Val Gln Thr Thr Gln Glu Glu Asp Gly Cys Ser Cys Arg Phe
            20                  25                  30

Pro Glu Glu Glu Glu Gly Gly Cys Glu Leu
        35                  40

<210> SEQ ID NO 32
<211> LENGTH: 126
<212> TYPE: DNA
<213> ORGANISM: Artificial sequence
<220> FEATURE:
<223> OTHER INFORMATION: the nucleic acid sequence of 4-1BB

<400> SEQUENCE: 32
aagagaggca ggaagaagct gctgtacatc ttcaagcagc ccttcatgcg ccccgtgcag     60
acaacccagg aggaggacgg ctgcagctgt cggttcccag aggaggagga gggaggatgt    120
gagctg                                                               126

<210> SEQ ID NO 33
<211> LENGTH: 112
<212> TYPE: PRT
<213> ORGANISM: Artificial sequence
<220> FEATURE:
<223> OTHER INFORMATION: the amino acid sequence of CD3zeta

<400> SEQUENCE: 33

Arg Val Lys Phe Ser Arg Ser Ala Asp Ala Pro Ala Tyr Gln Gln Gly
1               5                   10                  15

Gln Asn Gln Leu Tyr Asn Glu Leu Asn Leu Gly Arg Arg Glu Glu Tyr
            20                  25                  30

Asp Val Leu Asp Lys Arg Arg Gly Arg Asp Pro Glu Met Gly Gly Lys
        35                  40                  45

Pro Arg Arg Lys Asn Pro Gln Glu Gly Leu Tyr Asn Glu Leu Gln Lys
    50                  55                  60

Asp Lys Met Ala Glu Ala Tyr Ser Glu Ile Gly Met Lys Gly Glu Arg
65                  70                  75                  80

Arg Arg Gly Lys Gly His Asp Gly Leu Tyr Gln Gly Leu Ser Thr Ala
                85                  90                  95

Thr Lys Asp Thr Tyr Asp Ala Leu His Met Gln Ala Leu Pro Pro Arg
            100                 105                 110

<210> SEQ ID NO 34
<211> LENGTH: 336
<212> TYPE: DNA
<213> ORGANISM: Artificial sequence
<220> FEATURE:
<223> OTHER INFORMATION: the nucleic acid sequence of CD3zeta

<400> SEQUENCE: 34
agggtgaagt ttctcggag cgccgatgca ccagcatatc agcagggaca gaatcagctg      60
tacaacgagc tgaatctggg caggcgcgag gagtacgacg tgctggataa gcggagaggc    120
agagatcccg agatgggagg caagccaagg aggaagaacc ctcaggaggg cctgtataat    180

-continued

```
gagctgcaga aggacaagat ggccgaggcc tactctgaga tcggcatgaa gggagagcgg    240
agaaggggca agggacacga tggcctgtat cagggcctga gcacagccac caaggacacc    300
tacgatgcac tgcacatgca ggccctgcca cctagg                              336
```